(12) United States Patent
Mammou et al.

(10) Patent No.: US 11,494,947 B2
(45) Date of Patent: *Nov. 8, 2022

(54) POINT CLOUD ATTRIBUTE TRANSFER ALGORITHM

(71) Applicant: Apple Inc., Cupertino, CA (US)

(72) Inventors: Khaled Mammou, Vancouver (CA); Yeping Su, Cupertino, CA (US); Alexandros Tourapis, Los Gatos, CA (US); Jungsun Kim, San Jose, CA (US); Valery G. Valentin, San Jose, CA (US); Fabrice A. Robinet, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/119,938

(22) Filed: Dec. 11, 2020

(65) Prior Publication Data

US 2021/0097726 A1 Apr. 1, 2021

Related U.S. Application Data

(63) Continuation of application No. 16/380,931, filed on Apr. 10, 2019, now Pat. No. 10,867,414.

(Continued)

(51) Int. Cl.
*G06T 9/00* (2006.01)
*G06T 17/00* (2006.01)
(Continued)

(52) U.S. Cl.
CPC .............. *G06T 9/001* (2013.01); *G01S 17/89* (2013.01); *G06F 16/9027* (2019.01); *G06T 17/00* (2013.01); *G06T 2210/36* (2013.01)

(58) Field of Classification Search
CPC ............. G06K 9/6257; G06K 9/00711; G06K 9/00657; G06T 19/003; G06T 19/006;
(Continued)

(56) References Cited

U.S. PATENT DOCUMENTS 8,884,953 B2 11/2014 Chen et al.
9,064,311 B2 6/2015 Mammou et al.
(Continued)

FOREIGN PATENT DOCUMENTS

WO 2018050725 3/2018

OTHER PUBLICATIONS

Sebastian Schwarz, et al., "Emerging MPEG Standards for Point Cloud Compression", IEEE Journal on Emerging and Selected Topics In Circuits and Systems, vol. 9, No. 1, Mar. 2019, pp. 133-148.

(Continued)

*Primary Examiner* — Phuoc H Doan
(74) *Attorney, Agent, or Firm* — Alexander A. Knapp; Kowert, Hood, Munyon, Rankin & Goetzel, P.C.

(57) ABSTRACT

A system comprises an encoder configured to compress attribute information and/or spatial for a point cloud and/or a decoder configured to decompress compressed attribute and/or spatial information for the point cloud. A point cloud attribute transfer algorithm may be used to determine distortion between an original point cloud and a reconstructed point cloud. Additionally, the point cloud attribute transfer algorithm may be used to select attribute values for a reconstructed point cloud such that distortion between an original point cloud and a reconstructed version of the original point cloud is minimized.

20 Claims, 22 Drawing Sheets

Related U.S. Application Data

(60) Provisional application No. 62/655,768, filed on Apr. 10, 2018.

(51) Int. Cl.
*G06F 16/901* (2019.01)
*G01S 17/89* (2020.01)

(58) Field of Classification Search
CPC ..... G06T 9/001; G06T 2210/36; G06T 17/00; G06T 7/0012; G06F 3/165; G06F 3/167; G06F 16/9027; B64D 47/08
USPC .......................................... 382/232
See application file for complete search history.

(56) References Cited

U.S. PATENT DOCUMENTS

| | | | |
|---|---|---|---|
| 9,171,383 | B2 | 10/2015 | Ahn et al. |
| 10,762,667 | B2 | 9/2020 | Mekuria |
| 10,867,414 | B2 | 12/2020 | Mammou et al. |
| 2012/0124113 | A1 | 5/2012 | Zalik et al. |
| 2013/0034150 | A1 | 2/2013 | Sadafale |
| 2014/0036033 | A1 | 2/2014 | Takahashi |
| 2017/0347100 | A1 | 11/2017 | Chou et al. |
| 2017/0347122 | A1 | 11/2017 | Chou et al. |
| 2018/0192061 | A1 | 7/2018 | He |
| 2018/0268570 | A1 | 9/2018 | Budagavi et al. |
| 2019/0020880 | A1 | 1/2019 | Wang |
| 2019/0197739 | A1 | 6/2019 | Sinharoy et al. |
| 2020/0151913 | A1 | 5/2020 | Budagavi |
| 2020/0219285 | A1 | 7/2020 | Faramarzi et al. |
| 2020/0275129 | A1 | 8/2020 | Deshpande |
| 2020/0286261 | A1 | 9/2020 | Faramarzi et al. |
| 2020/0302578 | A1 | 9/2020 | Graziosi |
| 2021/0104014 | A1* | 4/2021 | Kolb, V ................ G06T 3/4053 |
| 2021/0383576 | A1 | 12/2021 | Olivier |
| 2022/0030258 | A1 | 1/2022 | Zhang |

OTHER PUBLICATIONS

Li Li, et al., Efficient Projected Frame Padding for Video-based Point Cloud Compression, IEEE Transactions on Multimedia, doi: 10.100/TMM.2020.3016894, 2020, pp. 1-14.

Lujia Wang, et al., "Point-cloud Compression Using Data Independent Method—A 3D Discrete Cosine Transform Approach", in Proceedings of the 2017 IEEE International Conference on Information and Automation (ICIA), Jul. 2017, pp. 1-6.

Ismael Daribo, et al., "Efficient Rate-Distortion Compression on Dynamic Point Cloud for Grid-Pattern-Based 3D Scanning Systems", 3D Research 3.1, Springer, 2012, pp. 1-9.

Yiting Shao, et al., "Attribute Compression of 3D Point Clouds Using Laplacian Sparsity Optimized Graph Transform", 2017 IEEE Visual Communications and Image Processing (VCIP), IEEE, 2017, p. 1-4.

Siheng Chen, et al., "Fast Resampling of 3D Point Clouds via Graphs", arX1v:1702.06397v1, Feb. 11, 2017, pp. 1-15.

Nahid Sheikhi Pour, "Improvements for Projection-Based Point Cloud Compression", MS Thesis, 2018, pp. 1-75.

Robert Skupin, et al., "Multiview Point Cloud Filtering for Spatiotemporal Consistency", VISAPP 2014—International Conference on Computer Vision Theory and Applications, 2014, pp. 531-538.

* cited by examiner

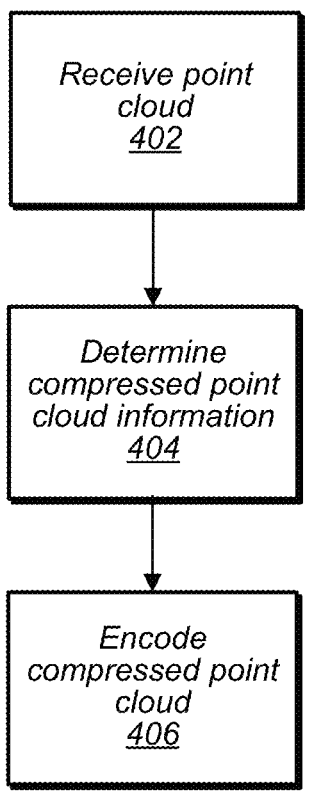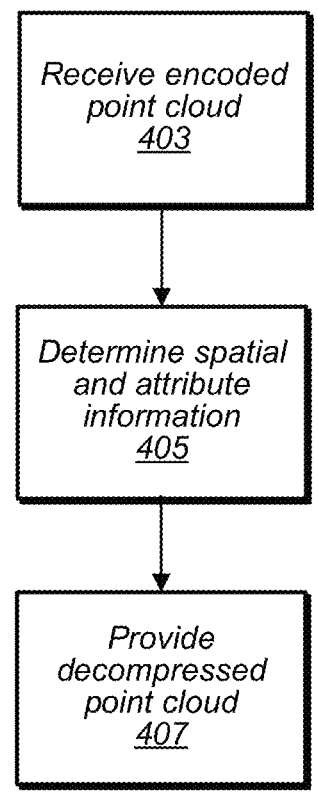
FIG. 4A
FIG. 4B

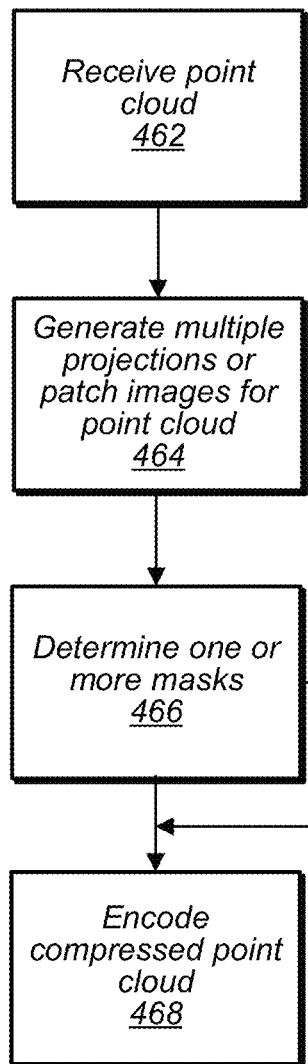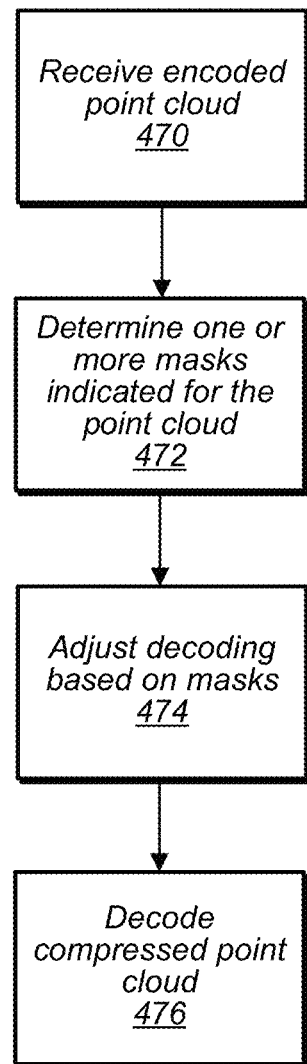
FIG. 4F
FIG. 4G

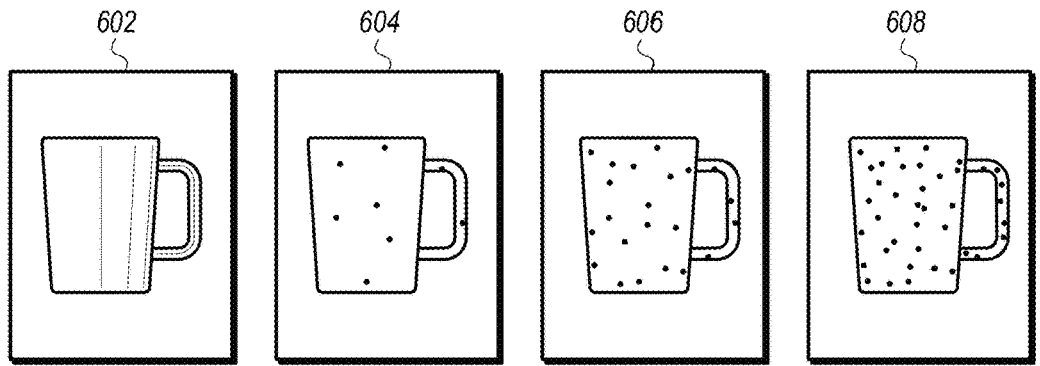

Level of Details

FIG. 6A

Compressed Attribute Information File  650

| Configuration Information | 652 |
|---|---|
| N (Number of Levels of Detail) <br> S (Level of Detail Initial Sampling Distance) <br> F (Sampling Distance Update Factor) <br> K (Number of nearest neighbors to identify) <br> C (Context encoding configuration(s)) <br> AI (Additional configuration information) | |
| Point Cloud Data <br> Attribute Information for Starting Points <br> $(X_A, Y_A, Z_A; A_{1A}, A_{2A}, A_{3A},); (Point\ N, A_{1N}, A_{2N}, A_{3N},), ...$ | 654 |
| Point Attribute Correction Values LOD1 <br>   Point A               Attribute 1 — +1 <br>                           Attribute 2 — -1 <br>                           Attribute 3 — 0 <br><br>   Point B               Attribute 1 — +2 <br>                           Attribute 2 — -2 <br><br> Point Attribute Correction Values LOD2 <br>   Point C               Attribute 1 — +2 <br>                           Attribute 2 — -3 <br><br>   Point D               Attribute 1 — +1 <br>                           Attribute 2 — 0 <br>                           Attribute 3 — -2 | 656 |

FIG. 6B

POINT CLOUD ATTRIBUTE TRANSFER ALGORITHM

PRIORITY CLAIMS

This application is a continuation of U.S. patent application Ser. No. 16/380,931, filed Apr. 10, 2019, which claims benefit of priority to U.S. Provisional Application Ser. No. 62/655,768, Apr. 10, 2018, and which are incorporated herein by reference in their entirety.

BACKGROUND

Technical Field

This disclosure relates generally to compression and decompression of point clouds comprising a plurality of points, each having associated spatial information and attribute information.

Description of the Related Art

Various types of sensors, such as light detection and ranging (LIDAR) systems, 3-D-cameras, 3-D scanners, etc. may capture data indicating positions of points in three dimensional space, for example positions in the X, Y, and Z planes. Also, such systems may further capture attribute information in addition to spatial information for the respective points, such as color information (e.g. RGB values), texture information, intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" comprising a set of points each having associated spatial information and one or more associated attributes. In some circumstances, a point cloud may include thousands of points, hundreds of thousands of points, millions of points, or even more points. Also, in some circumstances, point clouds may be generated, for example in software, as opposed to being captured by one or more sensors. In either case, such point clouds may include large amounts of data and may be costly and time-consuming to store and transmit.

SUMMARY OF EMBODIMENTS

In some embodiments, a system includes one or more sensors configured to capture points that collectively make up a point cloud, wherein each of the points comprises spatial information identifying a spatial location of the respective point and attribute information defining one or more attributes associated with the respective point.

The system also includes an encoder configured to compress the point cloud. The encoder is configured to encode spatial information for the point cloud, encode attribute information for the point cloud, generate, at the encoder, a re-constructed version of the point cloud based on the encoded spatial information, wherein at least some of the spatial locations of points or presence of points differs between the point cloud prior to the spatial information being encoded and the re-constructed version of the point cloud, and generate, at the encoder, re-constructed attribute values for the points of the re-constructed version of the point cloud. The encoder is also configured to determine respective differences between re-constructed attribute values for points in the re-constructed version of the point cloud and attribute values of corresponding points in the point cloud prior to encoding, select modified attribute values to be encoded for the attribute values such that a level of attribute value distortion between the point cloud prior to encoding and the re-constructed version of the point cloud is minimized, and encode modified attribute value information to be used at a decoder to generate a decoder generated re-constructed version of the point cloud, wherein the attribute value information is based on the modified attribute values that minimize attribute value distortion.

For example, due to losses introduced due to compression/encoding of spatial information, points in a re-constructed version of a point cloud may be slightly moved relative to locations of the points in the original captured point cloud. Also, in some embodiments, one or more points included in the original captured point cloud may be omitted from the re-constructed version of the point cloud. These geometry differences between the original captured point cloud and the re-constructed version of the point cloud may introduce texture distortion. For example, assigning the same attribute value (e.g. color value) to a point at a slightly different location in the re-constructed point cloud, as compared to the original captured point cloud, may distort the texture of the re-constructed version of the point cloud. In some embodiments, by generating a re-constructed version of the point cloud at the encoder and by iteratively selecting modified attribute values that take into account such changes in locations (or presence) of points between the original captured point cloud and a re-constructed version of the point cloud, texture distortion may be reduced.

In some embodiments, a method includes encoding spatial information for a captured or generated point cloud, encoding attribute information for the captured or generated point cloud, generating, at an encoder, a re-constructed point cloud based on the encoded spatial information, wherein at least some of the spatial locations of points or presence of points differs between the captured or generated point cloud and the re-constructed point cloud, and generating, at the encoder, generating re-constructed attribute values for the points of the re-constructed point cloud. The method also includes determining respective differences between re-constructed attribute values for points in the re-constructed point cloud and attribute values of corresponding points in the captured or generated point cloud and selecting modified attribute values to be encoded for the attribute values such that a level of attribute value distortion between the captured or generated point cloud and the re-constructed point cloud is minimized, wherein said determining the respective differences and said selecting the modified attribute values are performed based on a point cloud attribute transfer function. The method further includes encoding modified attribute value information to be used at a decoder to generate a decoder generated re-constructed version of the captured or generated point cloud, wherein the modified attribute value information is based on the selected modified attribute values that minimize attribute value distortion.

In some embodiments, a non-transitory computer-readable medium stores program instructions, that when executed on one or more processors, cause the one or more processors to encode spatial information for a captured or generated point cloud, encode attribute information for the captured or generated point cloud, generate a re-constructed version of the point cloud based on the encoded spatial information, wherein at least some of the spatial locations of points or presence of points differs between the captured or generated point cloud prior to the spatial information being encoded and the re-constructed version of the point cloud, and generate re-constructed attribute values for the points of the re-constructed version of the point cloud. The program instructions further cause the one or more processors to determine respective differences between attribute values of points in the captured or generated point cloud and attribute values for corresponding points in the re-constructed version of the point cloud, select modified attribute values to be encoded for the corresponding points such that a level of distortion between the captured or generated point cloud and the re-constructed version of the point cloud is minimized, wherein said determine the respective differences and said select the modified attribute values are performed based on a point cloud attribute transfer function, and encode modified attribute value information to be used at a decoder to generate a decoder generated re-constructed version of the point cloud, wherein the attribute value information is based on the selected modified attribute values that minimize attribute value distortion.

BRIEF DESCRIPTION OF THE DRAWINGS

FIG. 4A illustrates a process for compressing attribute and spatial information of a point cloud, according to some embodiments.

FIG. 4B illustrates a process for decompressing attribute and spatial information of a point cloud, according to some embodiments.

FIG. 4F illustrates an encoder, adjusting encoding based on one or more masks for a point cloud, according to some embodiments.

FIG. 4G illustrates a decoder, adjusting decoding based on one or more masks for a point cloud, according to some embodiments.

FIG. 6A illustrates an example LOD, according to some embodiments.

FIG. 6B illustrates an example compressed point cloud file comprising LODs, according to some embodiments.

Figure 1A:
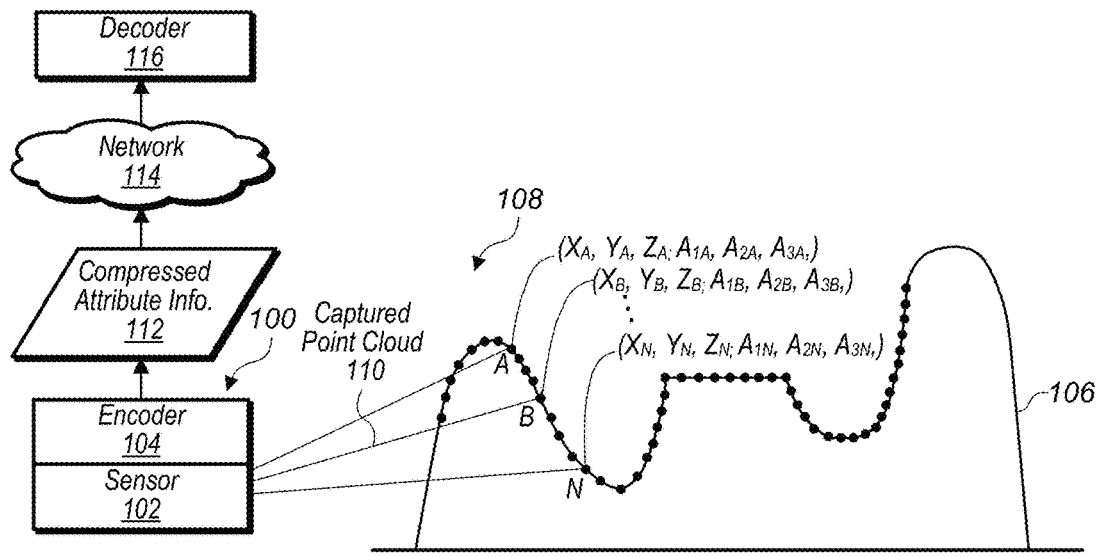
FIG. 1A illustrates a system comprising a sensor that captures information for points of a point cloud and an encoder that compresses attribute information of the point cloud, where the compressed attribute information is sent to a decoder, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture point clouds comprising thousands or millions of points in 2-D or 3-D space, such as via LIDAR systems, has increased. Also, the development of advanced display technologies, such as virtual reality or augmented reality systems, has increased potential uses for point clouds. However, point cloud files are often very large and may be costly and time-consuming to store and transmit. For example, communication of point clouds over private or public networks, such as the Internet, may require considerable amounts of time and/or network resources, such that some uses of point cloud data, such as real-time uses, may be limited. Also, storage requirements of point cloud files may consume a significant amount of storage capacity of devices storing the point cloud files, which may also limit potential applications for using point cloud data.

In some embodiments, an encoder may be used to generate a compressed point cloud to reduce costs and time associated with storing and transmitting large point cloud files. In some embodiments, a system may include an encoder that compresses attribute or spatial information of a point cloud file such that the point cloud file may be stored and transmitted more quickly than non-compressed point clouds and in a manner that the point cloud file may occupy less storage space than non-compressed point clouds. In some embodiments, compression of attributes of points in a point cloud may enable a point cloud to be communicated over a network in real-time or in near real-time. For example, a system may include a sensor that captures attribute information about points in an environment where the sensor is located, wherein the captured points and corresponding attributes make up a point cloud. The system may also include an encoder that compresses the captured point cloud attribute information. The compressed attribute information of the point cloud may be sent over a network in real-time or near real-time to a decoder that decompresses the compressed attribute information of the point cloud. The decompressed point cloud may be further processed, for example to make a control decision based on the surrounding environment at the location of the sensor. The control decision may then be communicated back to a device at or near the location of the sensor, wherein the device receiving the control decision implements the control decision in real-time or near real-time. In some embodiments, the decoder may be associated with an augmented reality system and the decompressed attribute information may be displayed or otherwise used by the augmented reality system. In some embodiments, compressed attribute information for a point cloud may be sent with compressed spatial information for points of the point cloud. In other embodiments, spatial information and attribute information may be separately encoded and/or separately transmitted to a decoder.

In some embodiments, a system may include a decoder that receives one or more point cloud files comprising compressed attribute information via a network from a remote server or other storage device that stores the one or more point cloud files. For example, a 3-D display, a holographic display, or a head-mounted display may be manipulated in real-time or near real-time to show different portions of a virtual world represented by point clouds. In order to update the 3-D display, the holographic display, or the head-mounted display, a system associated with the decoder may request point cloud files from the remote server based on user manipulations of the displays, and the point cloud files may be transmitted from the remote server to the decoder and decoded by the decoder in real-time or near real-time. The displays may then be updated with updated point cloud data responsive to the user manipulations, such as updated point attributes.

In some embodiments, a system, may include one or more LIDAR systems, 3-D cameras, 3-D scanners, etc., and such sensor devices may capture spatial information, such as X, Y, and Z coordinates for points in a view of the sensor devices. In some embodiments, the spatial information may be relative to a local coordinate system or may be relative to a global coordinate system (for example, a Cartesian coordinate system may have a fixed reference point, such as a fixed point on the earth, or may have a non-fixed local reference point, such as a sensor location).

In some embodiments, such sensors may also capture attribute information for one or more points, such as color attributes, reflectivity attributes, velocity attributes, acceleration attributes, time attributes, modalities, and/or various other attributes. In some embodiments, other sensors, in addition to LIDAR systems, 3-D cameras, 3-D scanners, etc., may capture attribute information to be included in a point cloud. For example, in some embodiments, a gyroscope or accelerometer, may capture motion information to be included in a point cloud as an attribute associated with one or more points of the point cloud. For example, a vehicle equipped with a LIDAR system, a 3-D camera, or a 3-D scanner may include the vehicle's direction and speed in a point cloud captured by the LIDAR system, the 3-D camera, or the 3-D scanner. For example, when points in a view of the vehicle are captured they may be included in a point cloud, wherein the point cloud includes the captured points and associated motion information corresponding to a state of the vehicle when the points were captured.

FIG. 1 illustrates a system comprising a sensor that captures information for points of a point cloud and an encoder that compresses attribute information of the point cloud, where the compressed attribute information is sent to a decoder, according to some embodiments.

System 100 includes sensor 102 and encoder 104. Sensor 102 captures a point cloud 110 comprising points representing structure 106 in view 108 of sensor 102. For example, in some embodiments, structure 106 may be a mountain range, a building, a sign, an environment surrounding a street, or any other type of structure. In some embodiments, a captured point cloud, such as captured point cloud 110, may include spatial and attribute information for the points included in the point cloud. For example, point A of captured point cloud 110 comprises X, Y, Z coordinates and attributes 1, 2, and 3. In some embodiments, attributes of a point may include attributes such as R, G, B color values, a velocity at the point, an acceleration at the point, a reflectance of the structure at the point, a time stamp indicating when the point was captured, a string-value indicating a modality when the point was captured, for example "walking", or other attributes. The captured point cloud 110 may be provided to encoder 104, wherein encoder 104 generates a compressed version of the point cloud (compressed attribute information 112) that is transmitted via network 114 to decoder 116. In some embodiments, a compressed version of the point cloud, such as compressed attribute information 112, may be included in a common compressed point cloud that also includes compressed spatial information for the points of the point cloud or, in some embodiments, compressed spatial information and compressed attribute information may be communicated as separate files.

In some embodiments, encoder 104 may be integrated with sensor 102. For example, encoder 104 may be implemented in hardware or software included in a sensor device, such as sensor 102. In other embodiments, encoder 104 may be implemented on a separate computing device that is proximate to sensor 102.

Point Cloud Attribute Transfer Algorithm

In some embodiments, a point cloud transfer algorithm may be used to minimize distortion between an original point cloud and a reconstructed version of the original point cloud. A transfer algorithm may be used to evaluate distortion due to the original point cloud and the reconstructed point cloud having points that are in slightly different positions. For example, a reconstructed point cloud may have a similar shape as an original point cloud, but may have a.) a different number of total points and/or b.) points that are slightly shifted as compared to a corresponding point in the original point cloud. In some embodiments, a point cloud transfer algorithm may allow the attribute values for a reconstructed point cloud to be selected (or modified) such that distortion between the original point cloud and a reconstructed version of the original point cloud is minimized. For example, for an original point cloud, both the positions of the points and the attribute values of the points are known. However, for a reconstructed point cloud, the position values may be known (for example based on a sub-sampling process, K-D tree process, or patch image process as described below). However, attribute values for the reconstructed point cloud may still need to be determined. Accordingly a point cloud transfer algorithm can be used to minimize distortion by selecting attribute values for the reconstructed point cloud that minimize distortion.

For each point of the re-constructed point cloud, an attribute value for the point can be selected and the distortion from the original point cloud to the reconstructed point cloud can be determined. Likewise the distortion from the reconstructed point cloud to the original point cloud can be determined. In many circumstances, these distortions are not symmetric. The point cloud transfer algorithm is initialized with two errors (E21) and (E12), where E21 is the error from the second or reconstructed point cloud to the original or first point cloud and E12 is the error from the first or original point cloud to the second or reconstructed point cloud. For each point in the second or re-constructed point cloud, it is determined whether the point should be assigned the attribute value of the corresponding point in the original point cloud, or an average attribute value of the nearest neighbors to the corresponding point in the original point cloud. The attribute value for each point is selected based on the smallest overall error when either of the two options is chosen. The process is repeated iteratively until the error E21 or the error E12 is below a threshold amount of error (e.g. a threshold distortion amount).

Below is a more detailed discussion of how a point cloud transfer algorithm is utilized to minimize distortion between an original point cloud and a reconstructed point cloud.

The attribute transfer problem could defined as follows:

Let $PC1=(P1(i))_{i \in [1, \ldots, N1]}$ be a point cloud defined by its geometry (i.e., 3D positions) $(X1(i))_{i \in [1, \ldots, N1]}$ and a set of attributes (e.g., RGB color or reflectance) $(A(i))_{i \in [1, \ldots, N1]}$. Let $PC2(P2(j))_{j \in [1, \ldots, N2]}$ be a re-sampled version of PC1 and let $(X2(j))_{j \in [1, \ldots, N2]}$ be its geometry.

Then compute the set of attribute of $(A2(j))_{j \in [1, \ldots, N2]}$ associated with the point of PC2 such that the texture distortion is minimized.

In order to solve the texture distortion minimization problem using an attribute transfer algorithm:

Let $P_{2 \to 1}(j) \in PC1$ be the nearest neighbor of $P2(j) \in PC2$ in PC1 and $A_{2 \to 1}(j)$ its attribute value.

Let $P_{1 \to 2}(i) \in PC2$ be the nearest neighbor of $P1(i) \in PC1$ in PC2 and $A_{1 \to 2}(i)$ its attribute value.

Let $\wp_{1 \to 2}(j)=(Q(j, h))_{h \in [1, \ldots, H(j)]} \subseteq PC2$ be the set of points of PC2 that share the point $P1(i) \in PC1$ as their nearest neighbor and $(\alpha(j, h))_{h \in [1, \ldots, H(j)]}$ be their attribute values Let $E_{2 \to 1}$ be the non-symmetric error computed from PC2 to PC1:

$E_{2 \to 1} = \Sigma_{j=1}^{N2} \|A2(j) - A_{2 \to 1}(j)\|^2$

Let $E_{1 \to 2}$ be the non-symmetric error computed from PC1 to PC2:

$E_{1 \to 2} = \Sigma_{i=1}^{N1} \|A1(j) - A_{1 \to 2}(j)\|^2$

Let E be symmetric error that measures the attribute distortion between PC2 to PC1:

$E = \max(E_{2 \to 1}, E_{1 \to 2})$

Then determine the set of attributes $(A2(j))_{j \in [1, \ldots, N2]}$ as follows:

Initialize E1→0 and E2→0
Loop over all the point of PC2

1) For each point $P2(j)$ compute $P_{2 \to 1}(j) \in PC1$ and $\wp_{1 \to 2}(j)$ 2) If $(E1 > E2$ or $\wp_{1 \to 2}(j) = \{\})$ $$A2(j) = A_{2 \to 1}(j)$$

3) Else $$A2(j) = \frac{1}{H(j)} \sum_{h=1}^{H(j)} \alpha(j, h)$$

4) *EndIf*

5) $E1 \leftarrow E1 + \|A2(j) - A_{2 \to 1}(j)\|^2$

Figure 1B:
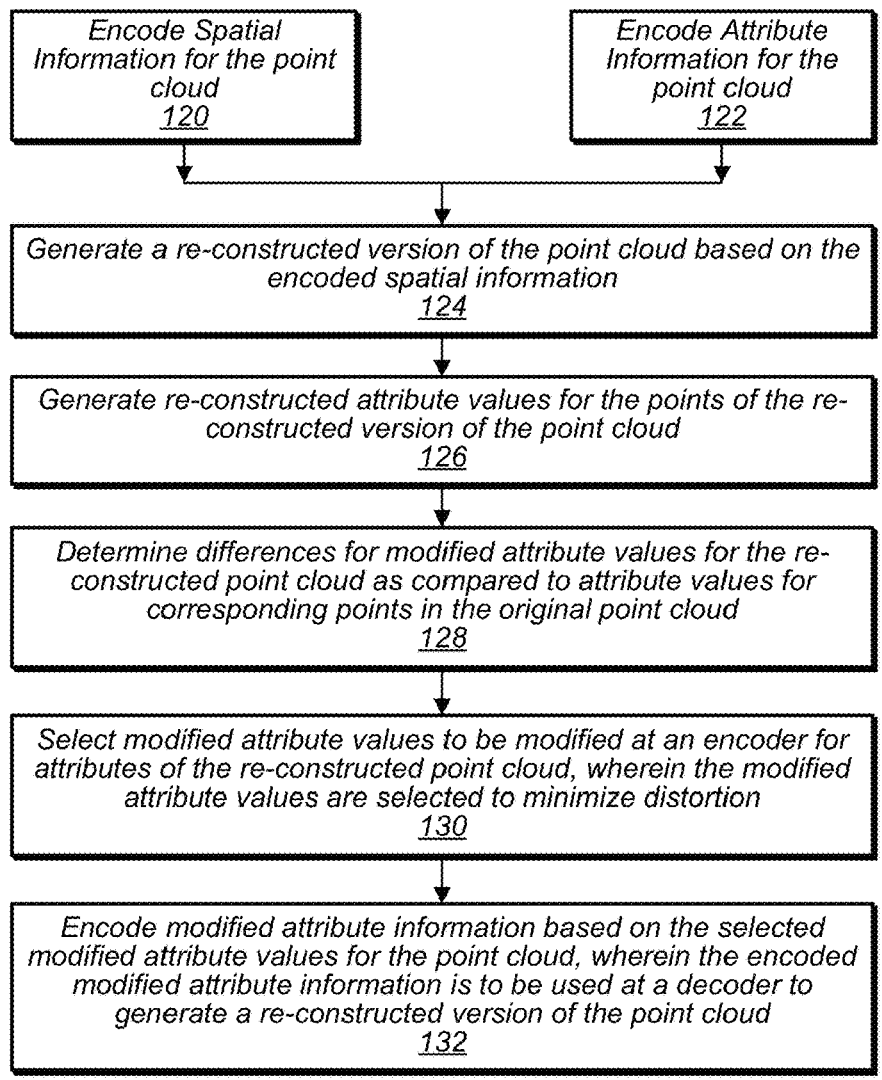
FIG. 1B illustrates a method of determining modified attribute values to be encoded taking into account distortion introduced by an encoder, according to some embodiments.

6) $E1 \leftarrow E2 + \left\|A2(j) - \frac{1}{H(j)} \sum_{h=1}^{H(j)} \alpha(j, h)\right\|^2$ FIG. 1B illustrates a method of determining modified attribute values to be encoded taking into account distortion introduced by an encoder, according to some embodiments.

Figure 1C:
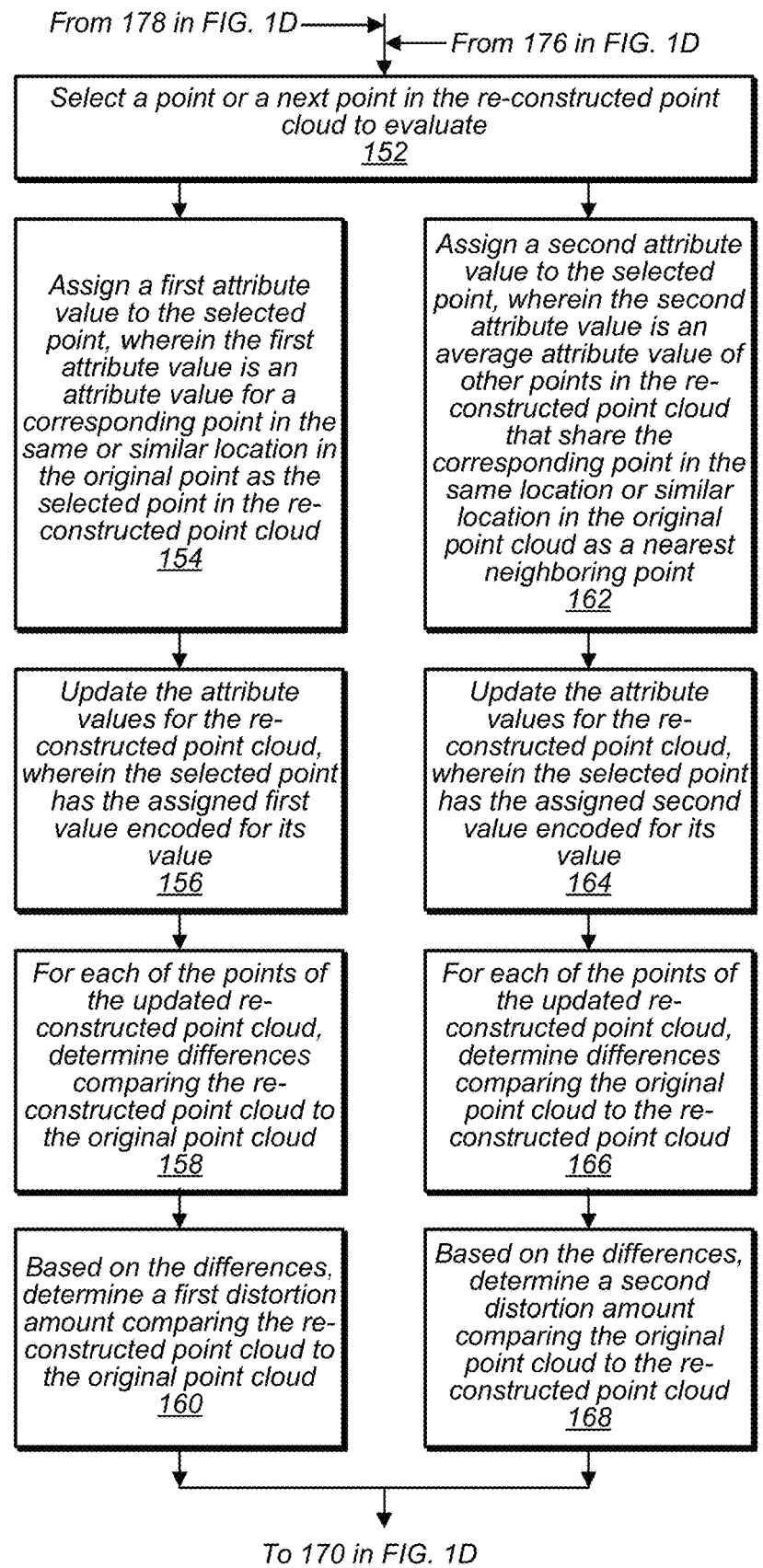
FIG. 1C illustrates a more detailed view of determining differences and selecting modified attribute values, according to some embodiments.
Figure 1D:
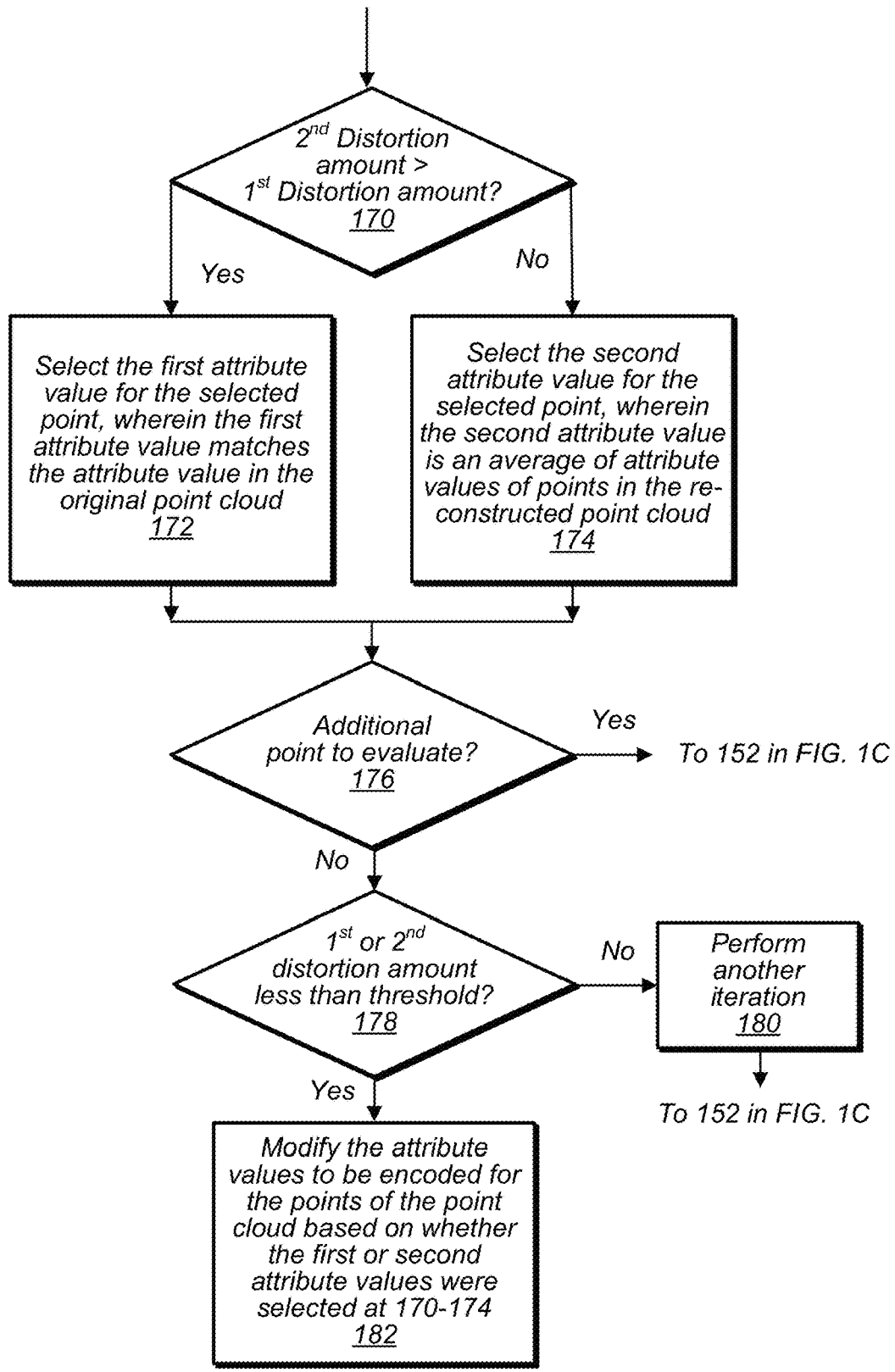
FIG. 1D illustrates a more detailed view of determining differences and selecting modified attribute values, according to some embodiments.

In some embodiments, the attribute transfer algorithm described above may be implemented in a process as described in FIG. 1B and in FIGS. 1C-1D.

At 120 spatial information for an original point cloud (e.g. a captured or generated point cloud) is encoded. Optionally at 122 attribute information for the original point cloud is encoded. Note that in some embodiments, the attribute transfer algorithm can determine attribute values to be used for a re-constructed point cloud without first encoding the attribute values using an attribute compression technique. However, in other embodiments, the attribute transfer algorithm may be used to determine modifications to make to attribute values that will be encoded via an attribute compression technique, such as an inverse distance based interpolation technique or a patch video compression technique, as described herein. The modified attribute values determined via the attribute transfer algorithm may take into account distortion introduced due to the change in position of points or absence of points due to lossy spatial information compression and also take into account distortion introduced due to the attribute compression technique that will be used to encode the attribute values to be used for the re-constructed point cloud.

At 124, a re-constructed version of the point cloud is generated based on the encoded spatial information. As discussed above, the encoding of the spatial information and generation of a re-constructed point cloud from the encoded spatial information may cause some of the points in the re-constructed version of the point cloud to be located in shifted locations as compared to the original point cloud prior to being encoded. Also, in some instances points included in the original version of the point cloud may be omitted from a re-constructed version of the point cloud.

At 126, re-constructed attribute values for the points of the re-constructed version of the point cloud are generated. In some embodiments, the re-constructed attribute values may be selected based on the original attribute values of the original point cloud or may be selected based on attribute values of neighboring points in the re-constructed version of the point cloud. In some embodiments a process as described in FIGS. 1C-1D may be used to generate the re-constructed attribute values for the points of the re-constructed version of the point cloud.

At 128 differences are determined for modified attribute values (e.g. various ones of the re-constructed attribute values generated at 126) as compared to attribute values for corresponding points in the original point cloud.

At 130, based on the differences determined at 128, modified attribute values to be encoded and used by a decoder to generate a re-constructed version of the point cloud are selected. In some embodiments, the modified attribute values may be selected such that distortion between the original point cloud and a re-constructed version of the point cloud, as re-constructed at a decoder, is minimized.

In some embodiments, wherein the attribute information for the point cloud is optionally encoded at 122, this may allow for parallelization between the spatial information encoding and the attribute information encoding. In such embodiments, some points in the re-constructed point cloud may have not moved. For these points the originally encoded attribute values may be maintained, while for other points that have changed location, modified attribute values may be determined. Also, in some embodiments, if a point has changed location in the re-constructed point cloud less than a threshold amount, then the originally encoded attribute value may be maintained. In some embodiments, such decisions could be made at a block level instead of a point level, for example when a patch image based video encoding technique is being used to encode the spatial information and the attribute information for the point cloud.

At 132, modified attribute information for the point cloud is encoded based on the selected modified attribute values, selected at 130.

FIGS. 1C-1D illustrate a more detailed view of determining differences and selecting modified attribute values, according to some embodiments.

In some embodiments, generating re-constructed attribute values, determining differences, and selecting modified attribute values as described in 126-130 in FIG. 1B may be achieved by following the steps described in FIGS. 1C-1D.

At 152 a first point or next point in the re-constructed point cloud is selected to be evaluated to determine a modified attribute value to be encoded for the selected point.

At 154, a first attribute value is assigned to the selected point being evaluated. The first attribute value may be a same attribute value as an attribute value of a corresponding point that is in a same or similar location as the point being evaluated, but in the original point cloud.

In some embodiments, wherein attribute compression takes into account attribute values for neighboring points, the attribute values for other points of the re-constructed point cloud may be updated at 156, wherein in the updated version the selected point being evaluated has the attribute value assigned at 154. This may account for how the assigned attribute value affects other points that are determined based on the attribute value for the selected point being evaluated either in an encoding or decoding process. In some embodiments, 156 may be omitted.

At 158, for each point of the re-constructed point cloud (that has updated attribute values and the assigned attribute value assigned at 154 for the selected point being evaluated) differences between the attribute values of the respective points in the reconstructed point cloud and attribute values of the nearest points to the respective points of the original point cloud are determined. For example, for a given point in the reconstructed point cloud, an attribute value of a corresponding point in the original point cloud may be subtracted from the attribute value for the given point in the reconstructed point cloud. This process may be repeated for each point in the re-constructed point cloud.

At 160, based on the differences determined at 158, a first distortion amount (e.g. E21) that compares the re-constructed point cloud to the original point cloud is determined.

Also, as part of generating re-constructed attribute values, determining differences, and selecting modified attribute values, at 162 through 168 an alternative attribute value is assigned to the selected point being evaluated, a second distortion amount is determined and the first and second distortion amounts are compared to determine whether the first or second attribute value should be selected for the selected point being evaluated.

For example, at 162, a second attribute value is assigned to the selected point being evaluated. The second attribute value is an interpolated value interpolated based on attribute values of other points in the re-constructed point cloud that share a common point in the original point cloud as the nearest neighboring point in the original point cloud for the set of neighboring points in the re-constructed point cloud.

At 164, the attribute values for the other points in the re-constructed point cloud are updated in a similar manner as described for 156.

At 166, differences are determined for each point of the re-constructed point cloud as compared to the original point cloud. This may be a similar process as described in 158. However at 166, instead of subtracting attribute values in the original point cloud from attribute values of points in the re-constructed point cloud, the differences may go the other way. For example, attribute values of points in the re-constructed point cloud may be subtracted from attribute values for the closest corresponding points in the original point cloud.

At 168, a second distortion amount (e.g. E12) may be determined. The second distortion amount may compare the original point cloud to the re-constructed point cloud.

At 170, it is determined whether the first or second distortion amount (e.g. determined at 166 or 168) is greater than the other one. If the second distortion amount is greater than the first distortion amount, at 172, the first attribute value is selected for the point being evaluated. Otherwise, at 174, the second attribute value is selected for the point being evaluated.

At 176, it is determined if there are other points to evaluate. If so, the process reverts to 152 and a next point to evaluate is selected and the process repeats for the next point being evaluated.

Once all the points of the re-constructed point cloud have been evaluated for a given iteration, it is determined, at 178, whether or not the first distortion amount and/or the second distortion amount is/are below a threshold level of distortion. If not, another iteration is performed, at 180, wherein each of the points of the re-constructed point cloud are evaluated taking the selected modified attribute values for the points from the previous iteration as an input for the next iteration. If the distortion threshold is met, at 182 the selected attribute values determined in the most recent iteration are assigned to the points as modified attribute values to be encoded that minimize distortion taking into account spatial distortion that will be introduced due to encoding and decoding spatial information for the point cloud.

In some embodiments 154, 156, 158, and 160 may be performed in parallel with 162, 164, 166, and 168.

Figure 2A:
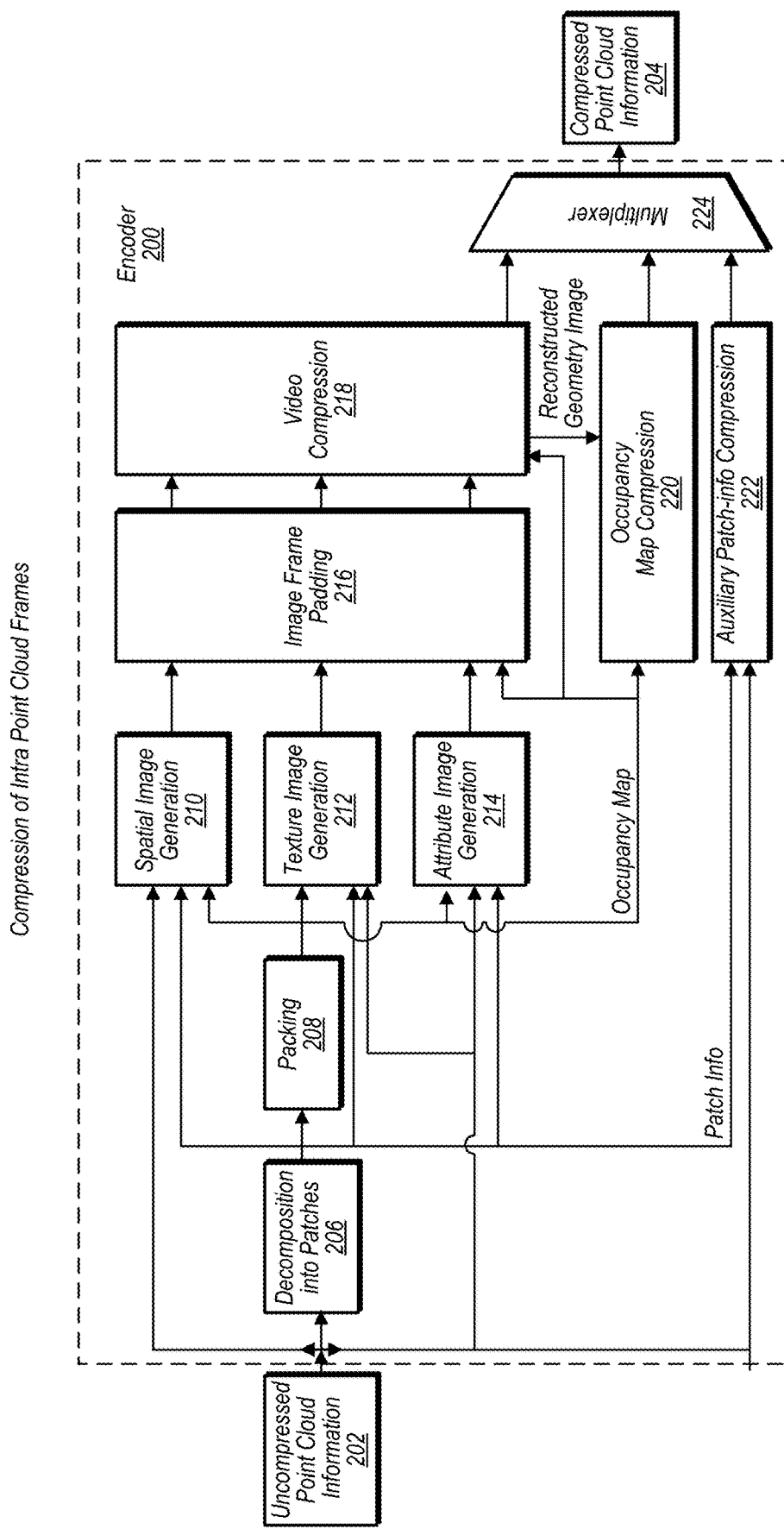
FIG. 2A illustrates components of an encoder for encoding intra point cloud frames, according to some embodiments.

FIG. 2A illustrates components of an encoder for encoding intra point cloud frames, according to some embodiments. In some embodiments, an encoder as described in FIG. 2A may be used to encode spatial information and/or attribute information as described in FIGS. 1A-1D. The encoder 200 receives uncompressed point cloud 202 and generates compressed point cloud information 204. In some embodiments, an encoder, such as encoder 202, includes decomposition into patches module 206, packing module 208, spatial image generation module 210, texture image generation module 212, and attribute information generation module 214. In some embodiments, an encoder, such as encoder 200, also includes image frame padding module 216, video compression module 218 and multiplexer 224. In addition, in some embodiments an encoder, such as encoder 200, may include an occupancy map compression module, such as occupancy map compression module 220, and an auxiliary patch information compression module, such as auxiliary patch information compression module 222. In some embodiments, an encoder, such as encoder 200, converts a 3D point cloud into an image-based representation with some meta data (e.g., occupancy map and patch info) necessary to invert the compressed point cloud back into a decompressed point cloud.

In some embodiments, the conversion process decomposes the point cloud into a set of patches (e.g., a patch is defined as a contiguous subset of the surface described by the point cloud), which may be overlapping or not, such that each patch may be described by a depth field with respect to a 3D plane. More details about the patch decomposition process will be provided below. Once the patches are determined, a uniform 2D sampling process is performed in planes associated with the patches. The uniform 2D sampling process may be applied in order to approximate each patch with a uniformly sampled point cloud, which may be stored as a set of 2D images describing the geometry/texture/attributes of the point cloud at the patch location. The "Packing" module may store the uniformly sampled point clouds associated with the patches in a single (or multiple) 2D images, referred to herein as "image frames." In some embodiments, a packing module, such as packing module 208, may pack the patch images such that the packed patch images to not overlap. Also, the packing module may pack the patch images in a way that minimizes non-used images pixels.

In some embodiments, "Geometry/Texture/Attribute generation" modules, such as modules 210, 212, and 214, generate 2D patch images associated with the geometry/texture/attributes, respectively, of the point cloud at a given patch location. As noted before, a packing process, such as performed by packing module 208, may leave some empty spaces between patch images packing in an image frame. Also, a padding module, such as image frame padding module 216, may fill such areas in order to generate an image that may be suited for 2D video and image codecs.

In some embodiments, an occupancy map (e.g., binary information describing for each pixel or block of pixels whether they are padded or not) may be generated and compressed, for example by occupancy map compression module 220. The occupancy map may be sent to a decoder to enable the decoder distinguish between padded and non-padded pixels. Note that other metadata associated with the patches may also be sent to a decoder for use in the decompression process. For example, patch information indicating sizes and shapes of patches determined for the point cloud may be generated and/or encoded by an auxiliary patch-information compression, such as auxiliary patch-information compression 222. In some embodiments one or more image frames may be encoded by a video encoder, such as video compression module 218. In some embodiments, a video encoder, such as video encoder 218, may operate in accordance with a high efficiency video coding (HEVC) standard or other suitable video encoding standard. In some embodiments, encoded video images, encoded occupancy map information, and encoded auxiliary patch information may be multiplexed by a multiplexer, such as multiplexer 224, and provided to a recipient as compressed point cloud information, such as compressed point cloud information 204.

In some embodiments, an occupancy map may be encoded and decoded by a video compression module, such as video compression module 218. This may be done at an encoder, such as encoder 200, such that the encoder has an accurate representation of what the occupancy map will look like when decoded by a decoder. Also, variations in image frames due to lossy compression and decompression may be accounted for by an occupancy map compression module, such as occupancy map compression module 220, when determining an occupancy map for an image frame.

Figure 2B:
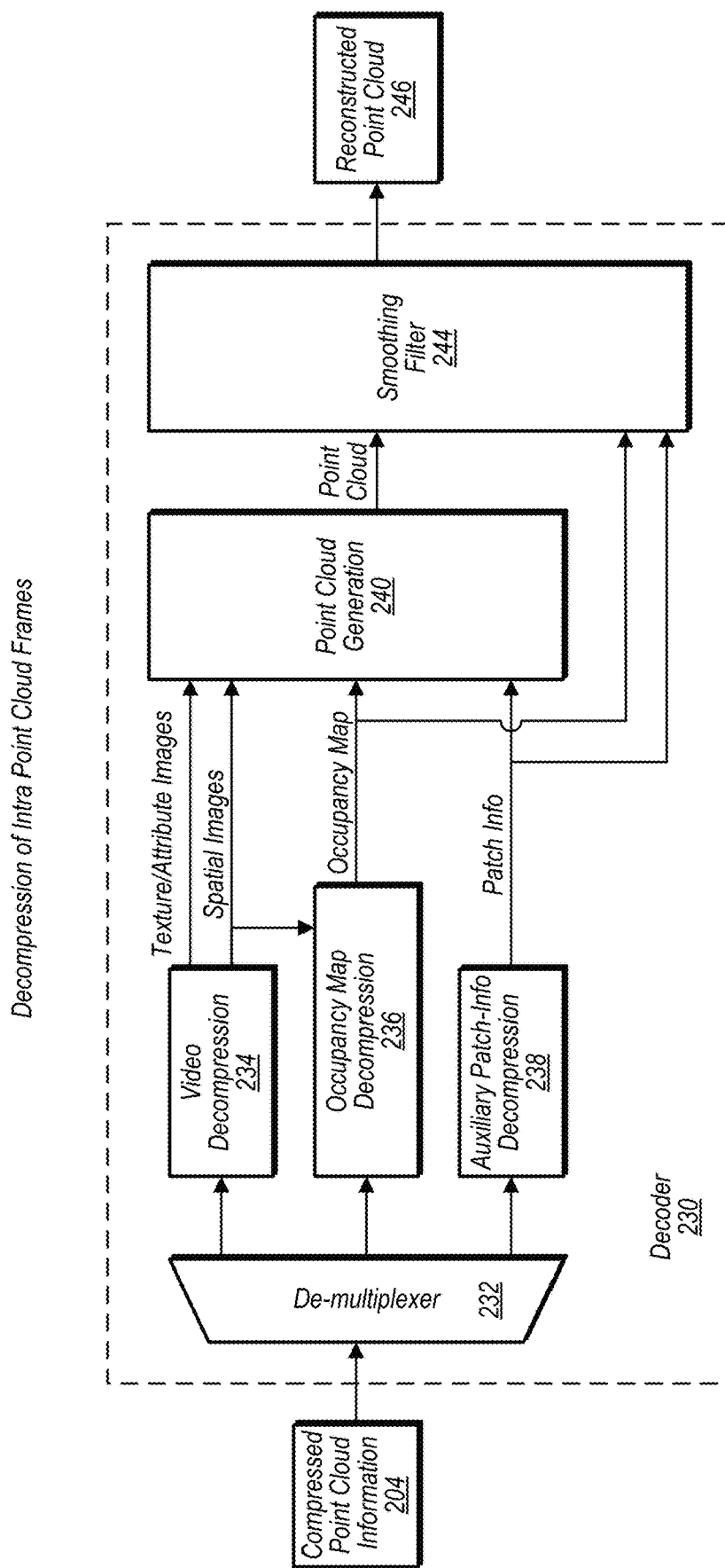
FIG. 2B illustrates components of a decoder for decoding intra point cloud frames, according to some embodiments.

FIG. 2B illustrates components of a decoder for decoding intra point cloud frames, according to some embodiments. In some embodiments, an encoder as described in FIG. 2B may be used to encode spatial information and/or attribute information as described in FIGS. 1A-1D. Decoder 230 receives compressed point cloud information 204, which may be the same compressed point cloud information 204 generated by encoder 200. Decoder 230 generates reconstructed point cloud 246 based on receiving the compressed point cloud information 204. In some embodiments, a decoder, such as decoder 230, includes a de-multiplexer 232, a video decompression module 234, an occupancy map decompression module 236, and an auxiliary patch-information decompression module 238. Additionally a decoder, such as decoder 230 includes a point cloud generation module, which reconstructs a point cloud based on patch images included in one or more image frames included in the received compressed point cloud information, such as compressed point cloud information 204. In some embodiments, a decoder, such as decoder 203, further comprises a smoothing filter, such as smoothing filter 244. In some embodiments, a smoothing filter may smooth incongruences at edges of patches, wherein data included in patches images for the patches has been used by the point cloud generation module to recreate a point cloud from the patch images for the patches. In some embodiments, a smoothing filter may be applied to the pixels located on the patch boundaries to alleviate the distortions that may be caused by the compression/decompression process.

Figure 2C:
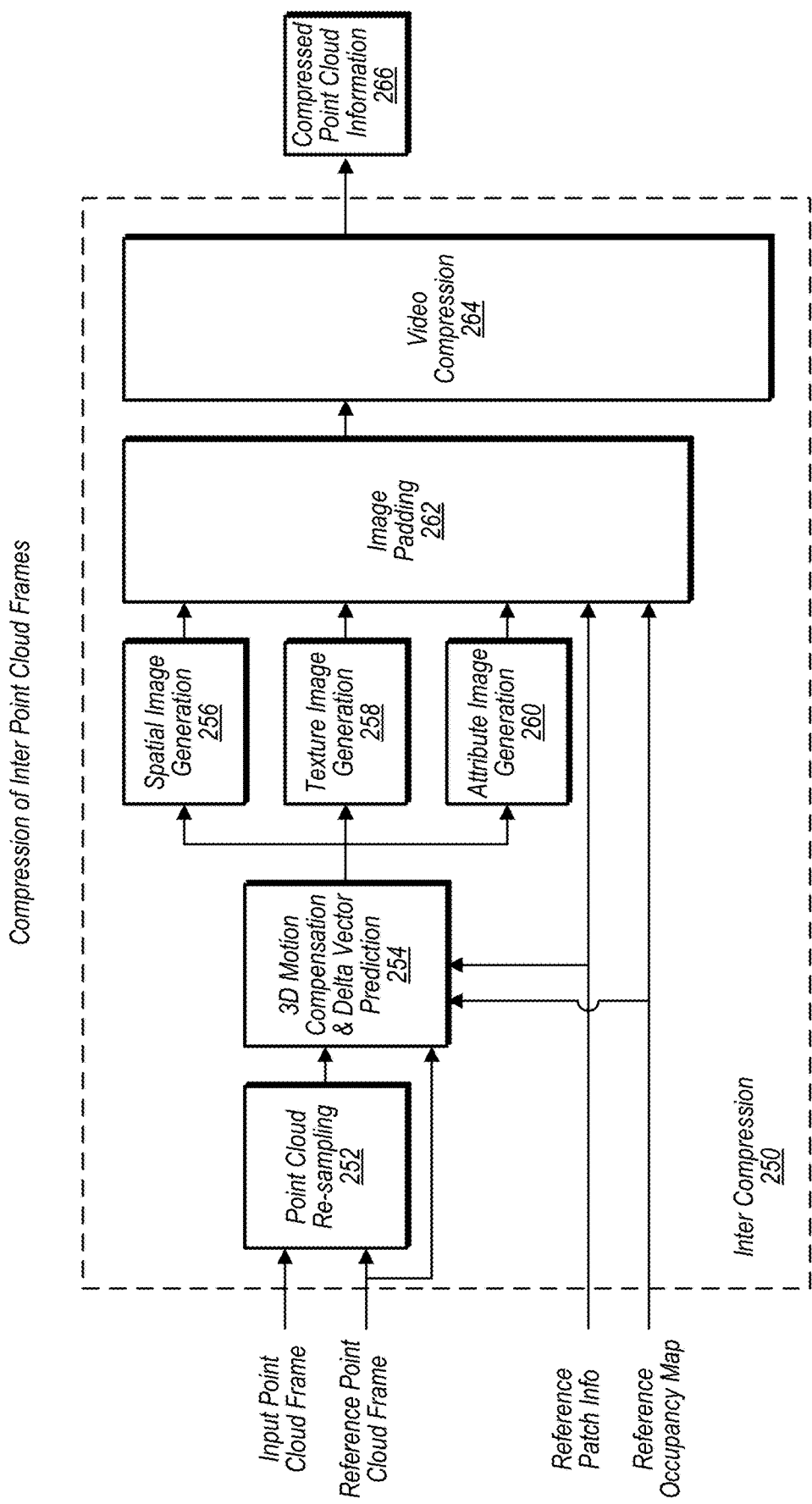
FIG. 2C illustrates components of an encoder for encoding inter point cloud frames, according to some embodiments.

FIG. 2C illustrates components of an encoder for encoding inter point cloud frames, according to some embodiments. In some embodiments, an encoder as described in FIG. 2C may be used to encode spatial information and/or attribute information as described in FIGS. 1A-1D. An intra point cloud encoder may encode an image frame, while considering a previously encoded/decoded image frame as a reference. In some embodiments, an encoder for inter point cloud frames, such as encoder 250 includes a point cloud re-sampling module 252, a 3-D motion compensation and delta vector prediction module 254, a spatial image generation module 256, a texture image generation module 258, and an attribute image generation module 260. In some embodiments, an encoder for inter point cloud frames, such as encoder 250 may also include an image padding module 262 and a video compression module 264. An encoder for inter point cloud frames, such as encoder 250, may generate compressed point cloud information, such as compressed point cloud information 266. In some embodiments, the compressed point cloud information may reference point cloud information previously encoded by the encoder, such as information from or derived from a reference image frame. In this way an encoder for inter point cloud frames, such as encoder 250, may generate more compact compressed point cloud by not repeating information included in a reference image frame, and instead communicating differences between the reference frame and a current state of the point cloud. In some embodiments, an encoder, such as encoder 250, may be combined with or share modules with, an intra point cloud frame encoder, such as encoder 200. In some embodiments, a point cloud re-sampling module, such as point cloud re-sampling module 252, may resample points in an input point cloud image frame in order to determine a one-to-one mapping between points in patches of the current image frame and points in patches of the reference image frame for the point cloud. In some embodiments, a 3D motion compensation & delta prediction module, such as a 3D motion compensation & delta prediction module 254, may apply a temporal prediction to the geometry/texture/attributes of the resampled points of the patches. The prediction residuals may be stored into images, which may be padded and compressed by using video/image codecs. In regard to spatial changes for points of the patches between the reference frame and a current frame, a 3D motion compensation & delta prediction module 254, may determine respective vectors for each of the points indicating how the points moved from the reference frame to the current frame. A 3D motion compensation & delta prediction module 254, may then encode the motion vectors using different image parameters. For example, changes in the X direction for a point may be represented by an amount of red included at the point in a patch image that includes the point. In a similar manner, changes in the Y direction for a point may be represented by an amount of blue included at the point in a patch image that includes the point. Also, in a similar manner, changes in the Z direction for a point may be represented by an amount of green included at the point in a patch image that includes the point. In some embodiments, other characteristics of an image included in a patch image may be adjusted to indicate motion of points included in the patch between a reference frame and a current frame.

Figure 2D:
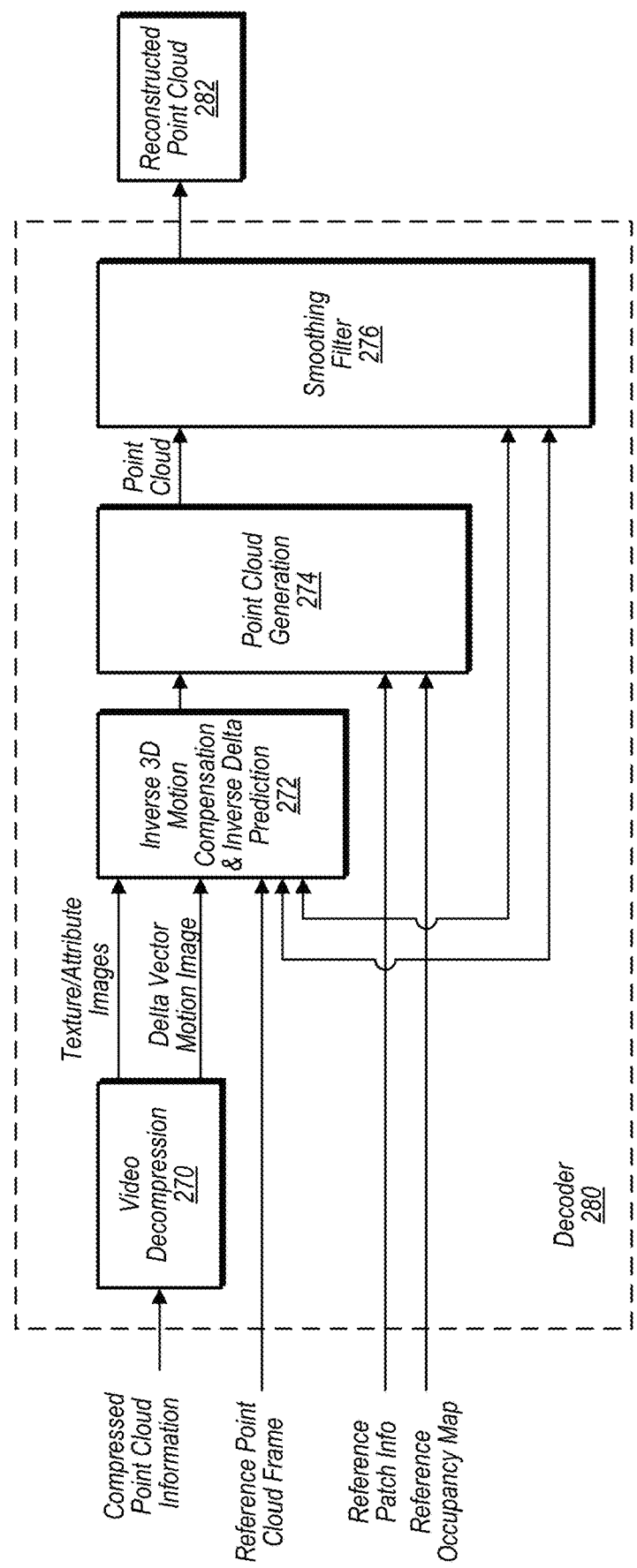
FIG. 2D illustrates components of a decoder for decoding inter point cloud frames, according to some embodiments.

FIG. 2D illustrates components of a decoder for decoding inter point cloud frames, according to some embodiments. In some embodiments, a decoder as described in FIG. 2D may receive encoded spatial information and/or encoded modified attribute information as described in FIGS. 1A-1D. In some embodiments, a decoder, such as decoder 280, includes a video decompression module 270, an inverse 3D motion compensation and inverse delta prediction module 272, a point cloud generation module 274, and a smoothing filter 276. In some embodiments, a decoder, such as decoder 280 may be combined with a decoder, such as decoder 230, or may share some components with the decoder, such as a video decompression module and/or smoothing filter. In decoder 280, the video/image streams are first decoded, then an inverse motion compensation and delta prediction procedure may be applied. The obtained images are then used in order to reconstruct a point cloud, which may be smoothed as described previously to generate a reconstructed point cloud 282.

Figure 3A:
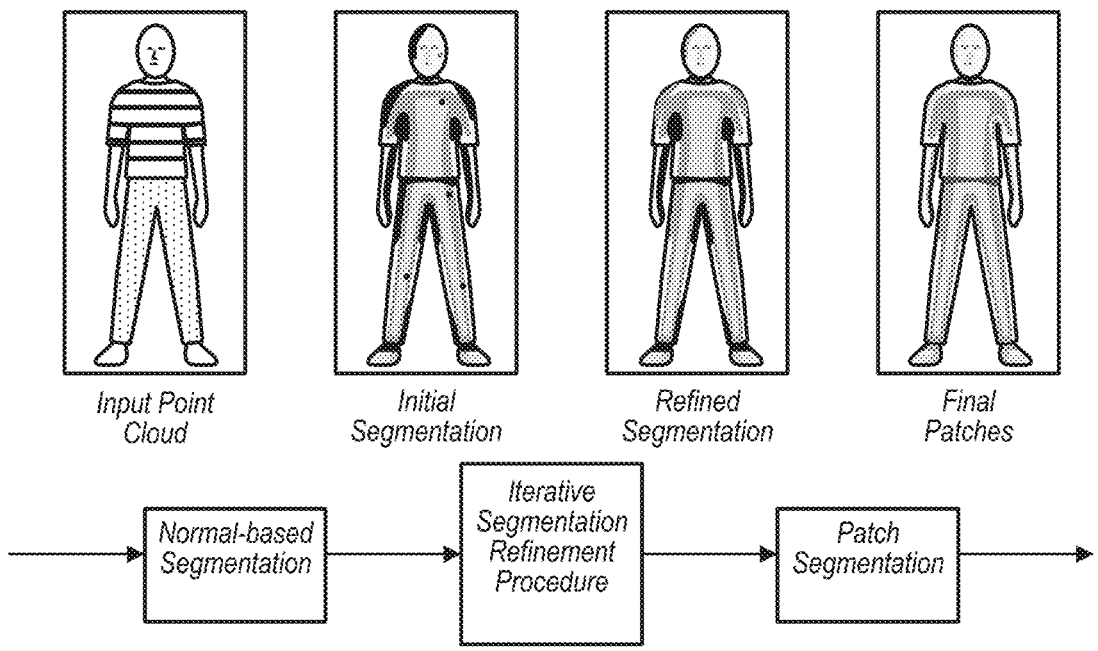
FIG. 3A illustrates an example patch segmentation process, according to some embodiments.

FIG. 3A illustrates an example segmentation process, according to some embodiments. The segmentation process as described in FIG. 3A may be performed by a decomposition into patches module, such as decomposition into patches module 206. A segmentation process may decompose a point cloud into a minimum number of patches (e.g., a contiguous subset of the surface described by the point cloud), while making sure that the respective patches may be represented by a depth field with respect to a patch plane. This may be done without a significant loss of shape information.

In some embodiments, a segmentation process comprises:

Letting PC be the input point cloud to be partitioned into patches and $\{P(0), P(1) \ldots, P(N-1)\}$ be the positions of points of PC.

In some embodiments, a fixed set $D=\{D(0), D(1), \ldots, D(K-1)\}$ of K 3D orientations is pre-defined. For instance, D may be chosen as follows $D=\{(1.0, 0.0, 0.0), (0.0, 1.0, 0.0), (0.0, 0.0, 1.0), (-1.0, 0.0, 0.0), (0.0, -1.0, 0.0), (0.0, 0.0, -1.0)\}$ In some embodiments, the normal at every point P(i) is estimated. Any suitable algorithm may be used to determine the normal. For instance, a technique could include fetching the set H of the n nearest points of P(i), and fit a plane Π(i) to H(i) by using principal component analysis techniques. The normal to P(i) may be estimated by taking the normal ∇(i) to Π(i). Note that n may be a user-defined parameter or may be found by applying an optimization procedure. "N" may also be fixed or adaptive. The normal values may then be oriented consistently by using a minimum-spanning tree approach.

Normal-based Segmentation: An initial segmentation S0 of the points of PC may be obtained by associating respective points with the direction D(k) which maximizes the score $\langle \nabla(i)|D(k)\rangle$, where $\langle .|.\rangle$ is the canonical dot product of R3. Pseudo code is provided below.

```
for (i = 0; i < pointCount; ++i) {
    clusterIndex = 0;
    bestScore = <V(i)|D(0)>;
    for(j = 1; j < K; ++j) {
        score = <V(i)|D(j)>;
        if (score > bestScore) {
            bestScore = score;
            clusterIndex = j;
        }
    }
    partition[i] = clusterIndex;
}
```

Iterative segmentation refinement: Note that S0 associates respective points with the plane Π(i) that best preserves the geometry of its neighborhood. In some circumstances, S0 may generate too many small connected components with irregular boundaries, which may result in poor compression performance. In order to avoid such issues, the following iterative segmentation refinement procedure may be applied:

1. An adjacency graph A may be built by associating a vertex V(i) to respective points P(i) of PC and by adding R edges {E(i,j(0)), ..., E(i,j(R−1)} connecting V(i) to its nearest neighbors {V(j(0)), V(j(1)), ..., V(j(R−1))}. More precisely, {V(j(0)), V(j(1)), ..., V(j(R−1))} may be the vertices associated with the points {P(j(0)), P(j(1)), ..., P(j(R−1))}, which may be the nearest neighbors of P(i). Note that R may be a user-defined parameter or may be found by applying an optimization procedure. It may also be fixed or adaptive.

2. At each iteration, the points of PC may be traversed and every vertex may be associated with the direction D(k) that maximizes $$\left(\langle \nabla(i)|D(k)\rangle + \frac{\lambda}{R}|\zeta(i)|\right),$$

where $|\zeta(i)|$ is the number of the R-nearest neighbors of V(i) belonging to the same cluster and $\lambda$ is a parameter controlling the regularity of the produced patches. Note that the parameters $\lambda$ and R may be defined by the user or may be determined by applying an optimization procedure. They may also be fixed of adaptive.

3. An example of pseudo code is provided below

```
for(l = 0; l < iterationCount; ++l) {
    for(i = 0; i < pointCount; ++i) {
        clusterIndex = partition[i];
        bestScore = 0.0;
        for(k = 0; k < K; ++k) {
            score = ⟨V(i)|D(k)⟩;
            for(j ∈ {j(0), j(1), ..., j(R − 1)}) {
                if (k == partition[j]) {
                    score += λ/R;
                }
            }
            if (score > bestScore) {
                bestScore = score;
                clusterIndex = k;
            }
        }
        partition[i] = clusterIndex;
    }
}
```

Patch segmentation: In some embodiments, the patch segmentation procedure further segments the clusters detected in the previous steps into patches, which may be represented with a depth field with respect to a set of planes. The proposed approach proceeds as follows, according to some embodiments:

1. First, a cluster-based adjacency graph for with a number of neighbors R' is built, while considering as neighbors only the points that belong to the same cluster. Note that R' may be different from the number of neighbors R used in the previous steps.

2. Next, the different connected components of the cluster-based adjacency graph are extracted. Only connected components with a number of points higher that a parameter α are considered. Let CC={CC(0), CC(1), ..., CC(M−1)} be the set of the extracted connected components.

3. Respective connected component CC(m), inherits the orientation D(m) of the cluster it belongs to. The points of CC(m) are then projected on a plane having as normal the orientation D(m), while updating a depth map, which records for every pixel the depth of the nearest point to the plane.

4. An approximated version of CC(m), denoted C'(m), is then built by associating respective updated pixels of the depth map with a 3D point having the same depth. Let PC' be the point cloud obtained by the union of reconstructed connected components {CC'(0), CC'(1), ..., CC'(M−1)}

5. Note that the projection reconstruction process may be lossy and some points may be missing. In order, to detect such points, every point P(i) of PC may be checked to make sure it is within a distance lower than a parameter δ from a point of PC'. If this is not the case, then P(i) may be marked as a missed point and added to a set of missed points denoted MP.

6. The steps 2-5 are then applied to MP. The process is repeated until MP is empty or CC is empty. Note that the parameters δ and α may be defined by the user or may be determined by applying an optimization procedure. They may also be fixed of adaptive.

7. A filtering procedure may be applied to the detected patches in order to make them better suited for compression, example filter procedures may include:
   a. Smoothing filter based on the geometry/texture/attributes (e.g., median filtering), which takes into account both spatial and temporal aspects.
   b. Discarding small and isolated patches
   c. User-guided filtering
   d. Other suitable smoothing filter techniques.

Packing

In some embodiments, depth maps associated with patches, also referred to herein as "depth patch images," such as those described above, may be packed into a 2D image. For example, a packing module, such as packing module 208, may pack depth patch images generated by a spatial image generation module, such as spatial image generation module 210. The depth maps, or depth patch images, may be packed such that no non-overlapping block of T×T pixels contains depth information from two different patches and such that a size of the generated image is minimized.

In some embodiments, packing comprises the following steps:

The patches are sorted by height and then by width. The patches are then inserted in (I) one after the other in that order. At each step, the pixels of (I) are traversed in raster order, while checking if the current patch could be inserted under the two conditions (A) and (B) described above. If it is not possible then the height of (I) is doubled.

This process is iterated until all the patches are inserted.

In some embodiments, the packing process described above may be applied to pack a subset of the patches inside multiples tiles or images. This may allow patches with similar/close orientations based on visibility according to the rendering camera position to be stored in the same image/tile, to enable view-dependent streaming and/or decoding. This may also allow parallel encoding/decoding.

In some embodiments, if temporal prediction is used, such as described for inter compression encoder 250, such an optimization may be performed with temporal prediction/coding in addition to spatial prediction/encoding. Such consideration may be made for the entire video sequence or per GOP. In the latter case additional constraints may be specified. For example a constraint may be that the resolution of the image should not exceed a threshold amount. In some embodiments, additional temporal constraints may be imposed, even if temporal prediction is not used, for example such as that a patch corresponding to a particular object view is not moved more than x number of pixels from previous instantiations.

Figure 3B:
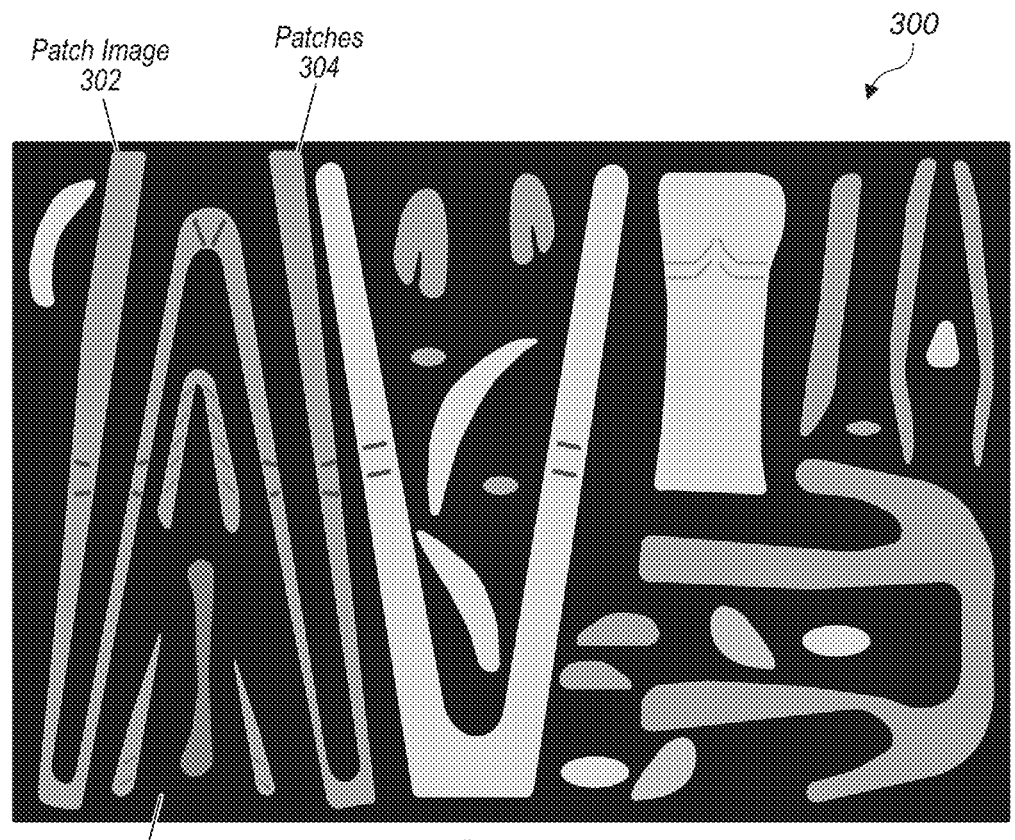
FIG. 3B illustrates an example image frame comprising packed patch images and padded portions, according to some embodiments.

FIG. 3B illustrates an example image frame comprising packed patch images and padded portions, according to some embodiments. Image frame 300 includes patch images 302 packed into patches 304 and also includes padding 306 in space not occupied by patch images. In some embodiments, padding, such as padding 306, may be determined to minimize incongruences between a patch image and the padding. For example, in some embodiments, padding may repeat pixel blocks that repeat or are similar to pixel blocks on edges of patch images. Because may image and video encoder encode based on differences between adjacent pixels, such as approach may reduce an amount of bytes required to encode an image frame comprising patch images and padding.

In some embodiments, the patch information may be stored in the same order as the one used during the packing, which makes it possible to handle patches 2D bounding box overlap.

Figure 3C:
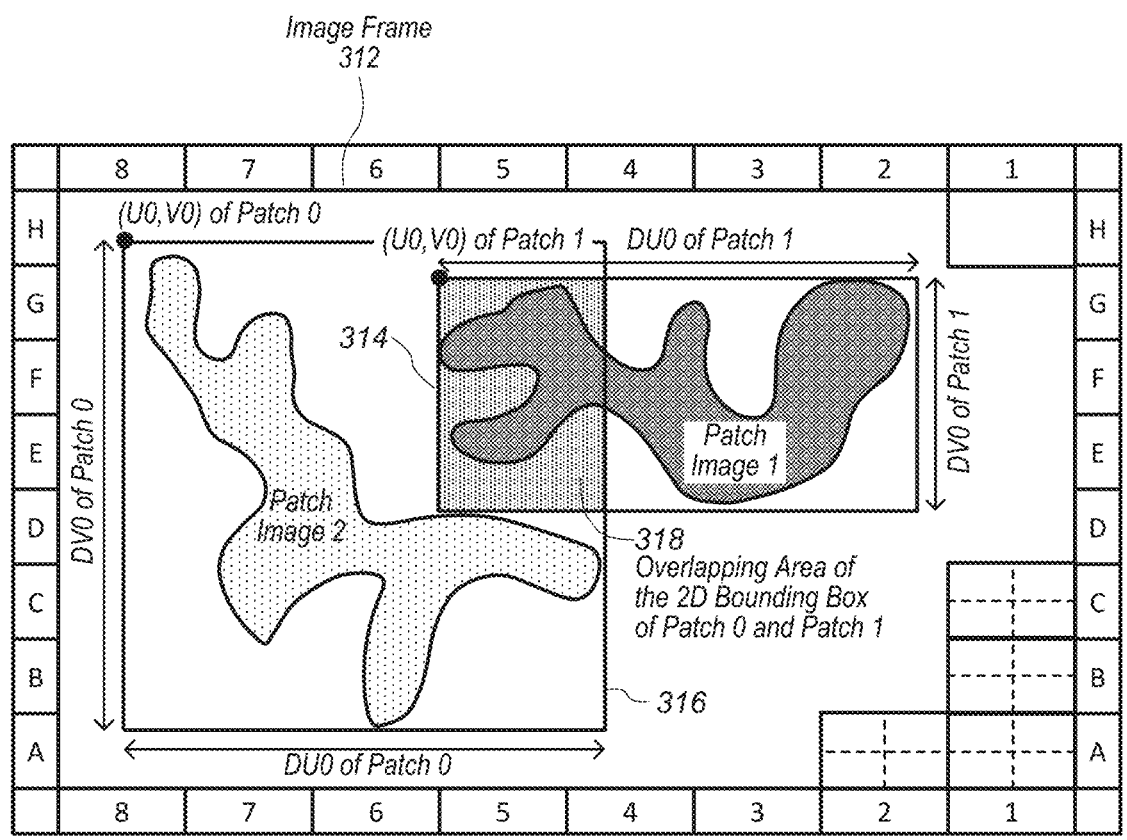
FIG. 3C illustrates an example image frame comprising patch portions, according to some embodiments.

FIG. 3C illustrates an example point cloud with overlapping patches, according to some embodiments. FIG. 3C shows an example image frame 312 with two patches (patch image 1 and patch image 2) having overlapping 2D bounding boxes 314 and 316 that overlap at 318. In order to determine to which patch belong the T×T blocks in the area, the order of the patches may be exploited. For example, the T×T block may belong to the last decoded patch. In some embodiments, the patch information is predicted and encoded (e.g., with any entropy/arithmetic encoder). Also, in some embodiments, U0, V0, DU0 and DV0 are encoded as multiples of T, where T is the block size used during the padding phase.

FIG. 3C also illustrates blocks of an image frame, wherein the blocks may be further divided into sub-blocks. For example block A1, B1, C1, A2, etc. may be divided into multiple sub-blocks, and in some embodiments the sub-blocks may be further divided into smaller blocks. In some embodiments, a video compression module, of an encoder, such as video compression module 218 or video compression module 264, whether a block comprises active pixels, non-active pixels, or a mix of active and non-active pixels. The video compression module may budget fewer resources to compresses blocks comprising non-active pixels than are budgeted for encoding blocks comprising active pixels. In some embodiments, a video compression module may sub-divide blocks comprising both active and non-active pixels and budget resources based on whether sub-blocks of the blocks comprise active or non-active pixels. For example, blocks A1, B1, C1, A2 may comprise non-active pixels. As another example block E3 may comprise active pixels, and block B6, as an example, may include a mix of active and non-active pixels.

In some embodiments, patch image may be determined based on projections, such as projecting a point cloud onto a cube, cylinder, sphere, etc. In some embodiments, a patch image may comprise a projection that occupies a full image frame without padding. For example, in a cubic projection each of the six cubic faces may be a patch image that occupies a full image frame.

Figure 3D:
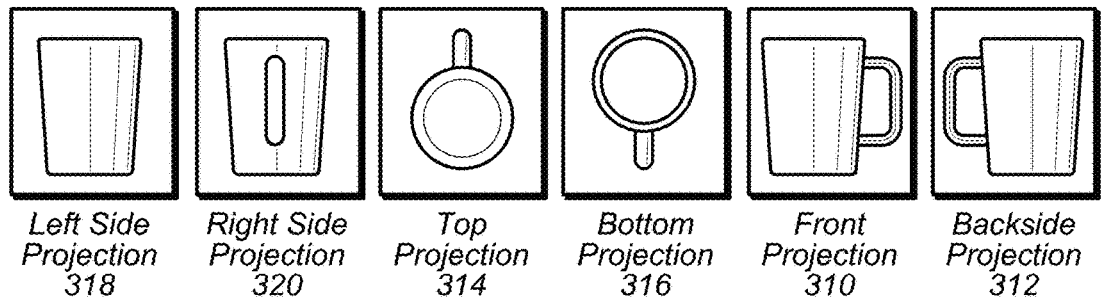
FIG. 3D illustrates a point cloud being projected onto multiple projections, according to some embodiments.

For example, FIG. 3D illustrates a point cloud being projected onto multiple projections, according to some embodiments.

In some embodiments, an initial representation of a point cloud is encoded using projections. In some embodiments, the projections may be encoded using conventional video compression methods, such as via a video compression module 218 or video compression module 264. In particular, the point cloud representation may be first projected onto a shape, such as a cube, and the different projections/faces projected onto that shape (i.e. front (310), back (312), top (314), bottom (316), left (318), right (320)) are all packed onto a single image. This information, as well as depth information may be encoded separately or with coding tools such as the ones provided in a 3D-HEVC (high efficiency video codec). The information may provide a representation of the point cloud since the projection images can provide the (x,y) geometry coordinates of all projected points of the point cloud. Additionally, depth information that provides the z coordinates may be encoded. When projecting a point cloud onto a cube, the projections might not cover all point cloud points, e.g. due to occlusions. Therefore additional information may be encoded to provide and update for these missing points.

In some embodiments, adjustments to a cubic projection that further improve upon such projections. For example, adjustments may be applied at the encoder only (non-normative) or applied to both the encoder and the decoder (normative).

More specifically, in some embodiments alternative projections may be used. For example, instead of using a cubic projection, a cylindrical or spherical type of projection method may be used. Such methods may reduce, if not eliminate redundancies that may exist in the cubic projection and reduce the number of "seams" that may exist in cubic projections. Such seams may create artifacts at object boundaries, for example. Eliminating or reducing such seams may result in improved compression/subjective quality as compared to cubic projection methods. For a spherical projection case, a variety of sub-projections may be used, such as the equirectangular, equiangular, and authagraph projection among others. These projections may permit the projection of a sphere onto a 2D plane.

In addition to, or instead of, considering a different projection method (such as cylindrical or spherical projections), in some embodiments multiple parallel projections may be used. The multiple parallel projections may provide additional information and may reduce a number of occluded points. The projections may be known at the decoder or signaled to the decoder. Such projections may be defined on planes or surfaces that are at different distances from a point cloud object. Also, in some embodiments the projections may be of different shapes, and may also overlap or cross through the point cloud object itself. These projections may permit capturing some characteristics of a point cloud object that may have been occluded through a single projection method.

Figure 3E:
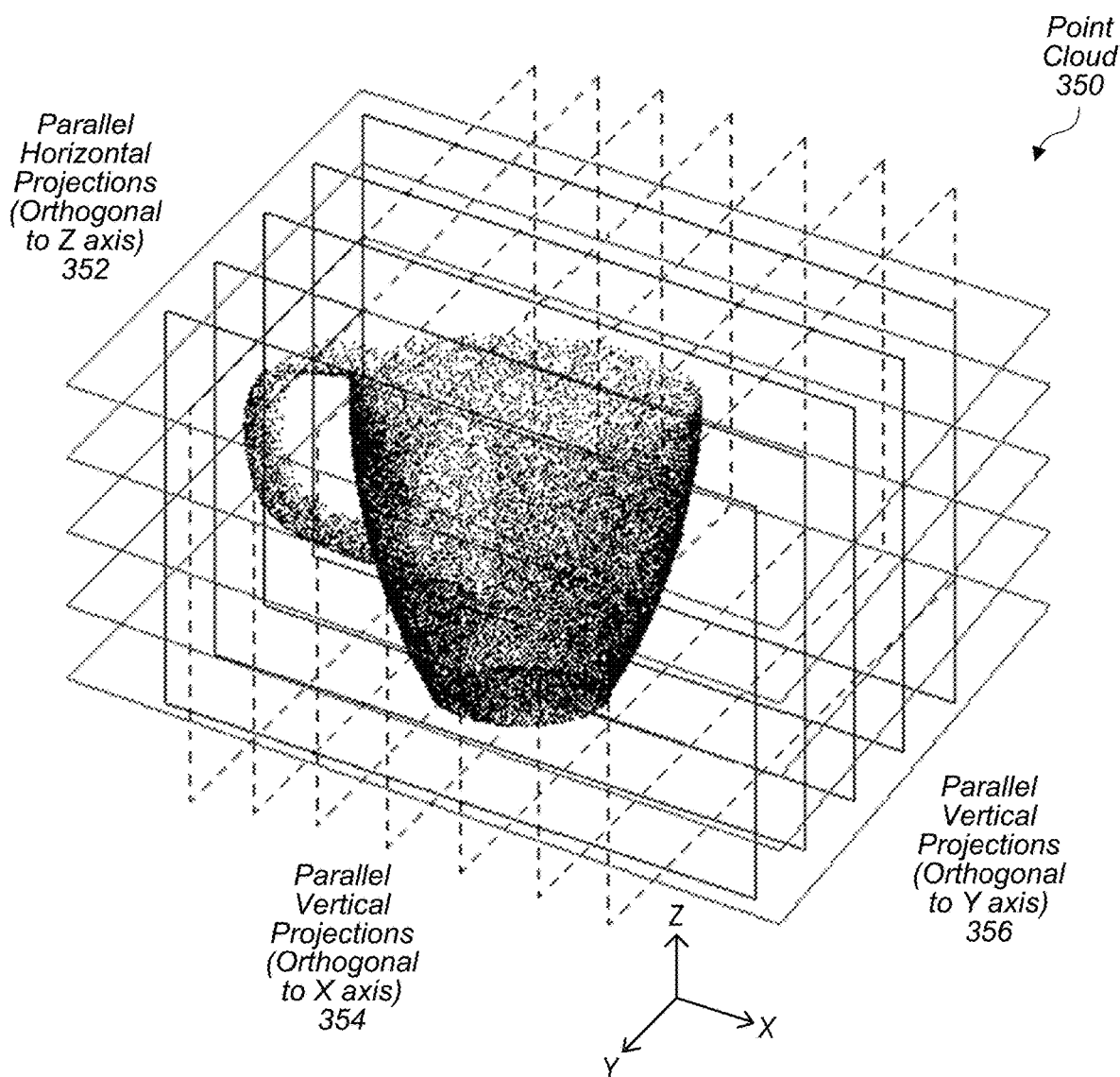
FIG. 3E illustrates a point cloud being projected onto multiple parallel projections, according to some embodiments.

For example, FIG. 3E illustrates a point cloud being projected onto multiple parallel projections, according to some embodiments. Point cloud 350 which includes points representing a coffee mug is projected onto parallel horizontal projections 352 that comprise planes orthogonal to the Z axis, is projected onto vertical projections 354 that comprise planes orthogonal to the X axis, and is projected onto vertical projections 356 that comprise plane orthogonal to the Y axis. In some embodiments, instead of planes, multiple projections may comprise projections having other shapes, such as multiple cylinders or spheres.

Generating Images

In some embodiments, only a subset a subset of the pixels of an image frame will be occupied and may correspond to a subset of 3D points of a point cloud. Mapping of patch images may be used to generate geometry, texture and attribute images, by storing for each occupied pixel the depth/texture/attribute value of its associated point.

In some embodiments, spatial information may be stored with various variations, for example spatial information may:

Store depth as a monochrome image

Store depth as Y and keep U and V empty (where YUV is a color space, also RGB color space may be used).

Store depth information for different patches in different color planes Y, U and V, in order to avoid inter-patch contamination during compression and/or improve compression efficiency (e.g., have correlated patches in the same color plane). Also, hardware codec capabilities may be utilized, which may spend the same encoding\decoding time independently of the content of the frame.

Store depth patch images on multiple images or tiles that could be encoded and decoded in parallel. One advantage is to store depth patch images with similar/close orientations or based on visibility according to the rendering camera position in the same image/tile, to enable view-dependent streaming and/or decoding.

Store depth as Y and store a redundant version of depth in U and V

Store X, Y, Z coordinates in Y, U, and V

Different bit depth (e.g., 8, 10 or 12-bit) and sampling (e.g., 420, 422, 444 . . . ) may be used. Note that different bit depth may be used for the different color planes.

Padding

In some embodiments, padding may be performed to fill the non-occupied pixels with values such that the resulting image is suited for video/image compression. For example, image frame padding module 216 or image padding module 262 may perform padding as described below.

In some embodiments, padding is applied on pixels blocks, while favoring the intra-prediction modes used by existing video codecs. More precisely, for each block of size B×B to be padded, the intra prediction modes available at the video encoder side are assessed and the one that produces the lowest prediction errors on the occupied pixels is retained. This may take advantage of the fact that video/image codecs commonly operate on pixel blocks with pre-defined sizes (e.g., 64×64, 32×32, 16×16 . . . ). In some embodiments, other padding techniques may include linear extrapolation, in-painting techniques, or other suitable techniques.

Video Compression

In some embodiments, a video compression module, such as video compression module 218 or video compression module 264, may perform video compression as described below. In some embodiments, a video compression module, such as video compression module 218 or video compression module 264, may be used to encode spatial information and/or attribute information as described in FIGS. 1A-1D.

In some embodiments, a video encoder may leverage an occupancy map which describes for each pixel of an image, whether it stores information belonging to the point cloud or padded pixels. In some embodiments, such information may permit enabling various features adaptively, such as de-blocking or self-adaptive offset (SAO). Also, such information may allow rate control to assign lower quality parameters (QPs) (or more bits) to the blocks containing the occupancy maps edges. Coding parameters, such as lagrangian multipliers, quantization thresholding, quantization matrices, etc. may also be adjusted according to the characteristics of the point cloud projected blocks. In some embodiments, such information may also enable rate distortion optimization (RDO) and rate control/allocation to leverage the occupancy map to consider distortions based on non-padded pixels. In a more general form, weighting of distortion may be based on the "importance" of each pixel to the point cloud geometry. Importance may be based on a variety of aspects, e.g. on proximity to other point cloud samples, directionality/orientation/position of the samples, etc. Facing forward samples, for example, may receive a higher weighting in the distortion computation than backward facing samples. Distortion may be computed using metrics such as Mean Square or Absolute Error, but different distortion metrics may also be considered, such as SSIM, VQM, VDP, Hausdorff distance, and others.

Occupancy Map Compression

In some embodiments, an occupancy map compression module, such as occupancy map compression module 220, may compress an occupancy map as described below.

In some embodiments, an occupancy map may be encoded in a hierarchical mode. Such a process may comprise:

1. A binary information for each B1×B2 pixel block (e.g., a rectangle that covers the entire image or 64×64 or 32×32 . . . ) being encoded indicating whether the block is empty (e.g., has only padded pixel) or non-empty (e.g., has non-padded pixels).
2. If the block is non-empty, then a second binary information may be encoded to indicate whether the block is full (e.g., all the pixels are non-padded) or not.
3. The non-empty and non-full blocks may then be refined by considering their (B1/2)×(B2/2) sub-blocks.
4. The steps 1-3 may be repeated until the size of the block reaches B0×B0 (e.g., 4×4 blocks). At this level only the empty/non-empty information may be encoded.
5. An entropy-based codec may be used to encode the binary information in steps 1 and 2. For instance, context adaptive binary arithmetic encoders may be used.
6. The reconstructed geometry image may be leveraged to better encode the occupancy map. More precisely, the residual prediction errors may be used to predict whether a block is empty or not or full or not. Such an information may be incorporated by using a different context based on the predicted case or simply by encoding the binary value XORed with predicted value.

In some embodiments, mesh-based codecs may be an alternative to the approach described above.

Auxiliary Patch-Information Compression

In some embodiments, for each patch, the following information may be encoded. For example, by auxiliary patch-info compression module 222.

Its location (U0, V0) in the packed image frame and the extent of its 2D bounding box (DU0, DV0)

Minimum/maximum/average/median depth value

Index of the projection direction

Point Cloud Resampling

In some embodiments, a point cloud resampling module, such as point cloud resampling module 252, may resample a point cloud as described below.

In some embodiments, dynamic point clouds may have a different number of points from one frame to another. Efficient temporal prediction may require mapping the points of the current frame, denoted CF, to the points of a reference frame, denoted RF. Signaling such a mapping in a bit stream may require a high number of bits and thus may be inefficient. Instead, re-sampling of a CF may be performed so that the CF has the same number of points as RF. More precisely, the points of RF may be displaced such that its shape matches the shape of CF. As a second step, the color and attributes of CF may be transferred to the deformed version of RF. The obtained frame CF' may be considered as the re-sampled version of the current frame. The decision to compress the approximation CF' of CF may be made by comparing the RD costs of both options (e.g., encoding CF' as inter-frame vs. encoding CF as intra-frame). In some embodiments, pre-adjusting RF may be performed in an effort to make it a better reference for future CF pictures. Resampling may comprise the following:

First, normals of the points associated with CF and RF may be estimated and oriented consistently. For every point P belonging to CF (resp. Q belonging to RF), let α(P) (resp., α(Q)) be its position and ∇(P) (resp., ∇(Q)) its normal. A 6D vector, denoted υ(P) (resp., υ(Q)) is then associated with every point by combining its position and a weighted version of its normal in the same vector.

$$\upsilon(P) = \begin{bmatrix} \alpha(P) \\ \varepsilon \nabla(P) \end{bmatrix} \upsilon(Q) = \begin{bmatrix} \alpha(Q) \\ \varepsilon \nabla(Q) \end{bmatrix},$$

where ε is a parameter controlling the importance of normal for positions. ε could be defined by the user or could be determined by applying an optimization procedure. They could also be fixed of adaptive.

Two mappings from RF to CF and CF to RF are computed as follows:
i. Every point Q of RF is mapped to the point P(Q) of CF that has the minimum distance to Q in the 6D space defined in the previous step.
ii. Every point P of CF is mapped to the point Q(P) of RF that has the minimum distance to P in the 6D space defined in the previous step. Let ρ(Q) be the set of points of CF that are mapped to the same point Q.

At each iteration
i. The positons of the points of RF are updated as follows:

$$\alpha'(Q) = w \cdot \alpha(P(Q)) + \frac{(1-w)}{|\rho(Q)|} \sum_{P \in \rho(Q)} \alpha(P),$$

where |ρ(Q)| is the number of elements of ρ(Q). The parameter w could be defined by the user or could be determined by applying an optimization procedure. It could also be fixed or adaptive.

ii. The previous updated step results usually in an irregular repartition of the points. In order to overcome such limitations, a Laplacian-based smoothing procedure is applied. The idea is to update the positions of the points such that they stay as close as possible to {α'(Q)}, while favoring a repartition as close as possible to original point repartition in RF. More precisely, following sparse linear system may be solved:

$$\{\alpha^*(Q)\} = \operatorname{argmin}_{\{\alpha'(Q)\}} \left\{ \sum_{Q \in RF} \|\alpha''(Q) - \alpha'(Q)\|^2 + \gamma \sum_{Q \in RF} \left\| \alpha''(Q) - \frac{1}{R} \sum_{Q' \in N(Q)} \alpha''(Q') - \alpha(Q) - \frac{1}{R} \sum_{Q' \in N(Q)} \alpha(Q') \right\|^2 \right\},$$

where N(Q) is the set of the R nearest neighbors of Q in RF.

iii. The mappings between the updated RF' point cloud and CF are then updated as follows
1. Every point Q of RF' is mapped to the point P(Q) of CF that has the minimum distance to Q in the 3D space of positions.
2. Every point P of CF is mapped to the point Q(P) of RF that has the minimum distance to P in the 3D space of positions. Let ρ(Q) be the set of points of CF that are mapped to the same point Q.

This process is iterated until a pre-defined number of iterations is reached.

At this stage, the color and attribute information is transferred from CF to RF' by exploiting the following formula $$A(Q) = w(A) \cdot A(P(Q)) + \frac{(1-w(A))}{|\rho(Q)|} \sum_{P \in \rho(Q)} A(P),$$

where A stands for the texture or attribute to be transferred, |ρ(Q)| is the number of elements of ρ(Q). The parameter w(A) could be defined by the user or could be determined by applying an optimization procedure. It could also be fixed of adaptive.

3D Motion Compensation

In some embodiments, the positions, attributes and texture information may be temporally predicted by taking the difference between the value at current resampled frame minus the value at the reference frame. These values may be fed to the image generation stage to be stored as images. For example, such techniques may be performed by 3D motion compensation and delta vector prediction module 254.

Smoothing Filter

In some embodiments, a smoothing filter, such as smoothing filter 244 or smoothing filter 276, may perform smoothing as described below.

In some embodiments, a reconstructed point cloud may exhibit discontinuities at the patch boundaries, especially at very low bitrates. In order to alleviate such a problem, a smoothing filter may be applied to the reconstructed point cloud. Applying the smoothing filter may comprise:

By exploiting the occupancy map, both the encoder and the decoder may be able to detect boundary points, which are defined as being points belonging to B0×B0 blocks encoding during the last iteration of the hierarchical occupancy map compression procedure described in previous sections.

The boundary points may have their positions/attribute/texture updated. More precisely, respective boundary points could be assigned a smoothed position based on its R nearest neighbors in the point cloud. The smoothed position may be the centroid/median of the nearest neighbors. Another option may consist in fitting a plane or any smooth surface the nearest neighbor and assigning as smoothed position the projection of the point on that surface. The number of parameters and/or the smoothing strategy may be chosen by user or determined by applying an optimization strategy. They may be fixed for all the points or chosen adaptively. These parameters will be signaled in the bit stream.

In order to reduce the computational complexity of the smoothing stage, a subsampled version of the reconstructed point cloud could be considered when looking for the nearest neighbors. Such subsampled version could be efficiently derived by considering a subsampled version the geometry image and the occupancy map.

FIG. 4A illustrates a process for compressing attribute and spatial information of a point cloud, according to some embodiments.

At 402, a point cloud is received by an encoder. The point cloud may be captured, for example by one or more sensors, or may be generated, for example in software.

At 404, compressed point cloud information is determined, using any of the techniques described herein or using one more combinations of the techniques described herein.

At 406, a compressed point cloud is encoded using the compressed point cloud information determined at 404. The point cloud may be compressed using any of the techniques described herein.

FIG. 4B illustrates a process for decompressing attribute and spatial information of a point cloud, according to some embodiments.

At 403 an encoded point cloud is received. The point cloud may have been encoded using any of the encoding techniques described herein, such as patch images packed into an image frame that is then encoded by a video encoder. In some embodiments, the encoded point cloud may comprise point cloud projections, such as projections onto a cube, cylinder, sphere, etc. that are then encoded via a video encoder.

At 405, spatial and attribute information for the encoded point cloud is determined. For example, a video decoder may be used to decode video encoded packed images or projects. Spatial information may then be determined based on the packed images or projections and combined to determine spatial information for points of the point cloud. For example, depth information for points of a patch may be matched with X and Y information for the points of the patch to determine spatial information for the points of the patch in 3D space. In a similar manner other attributes, included in patch images such as color attributes, texture attributes, etc. may be matched with corresponding points to determine attribute values for the points. Also, in the case of multiple projections, the same point may be identified in more than one of the projections to determine spatial information for the point in 3D space.

At 407, a decompressed point cloud may be provided to a recipient device or module.

Figure 4C:
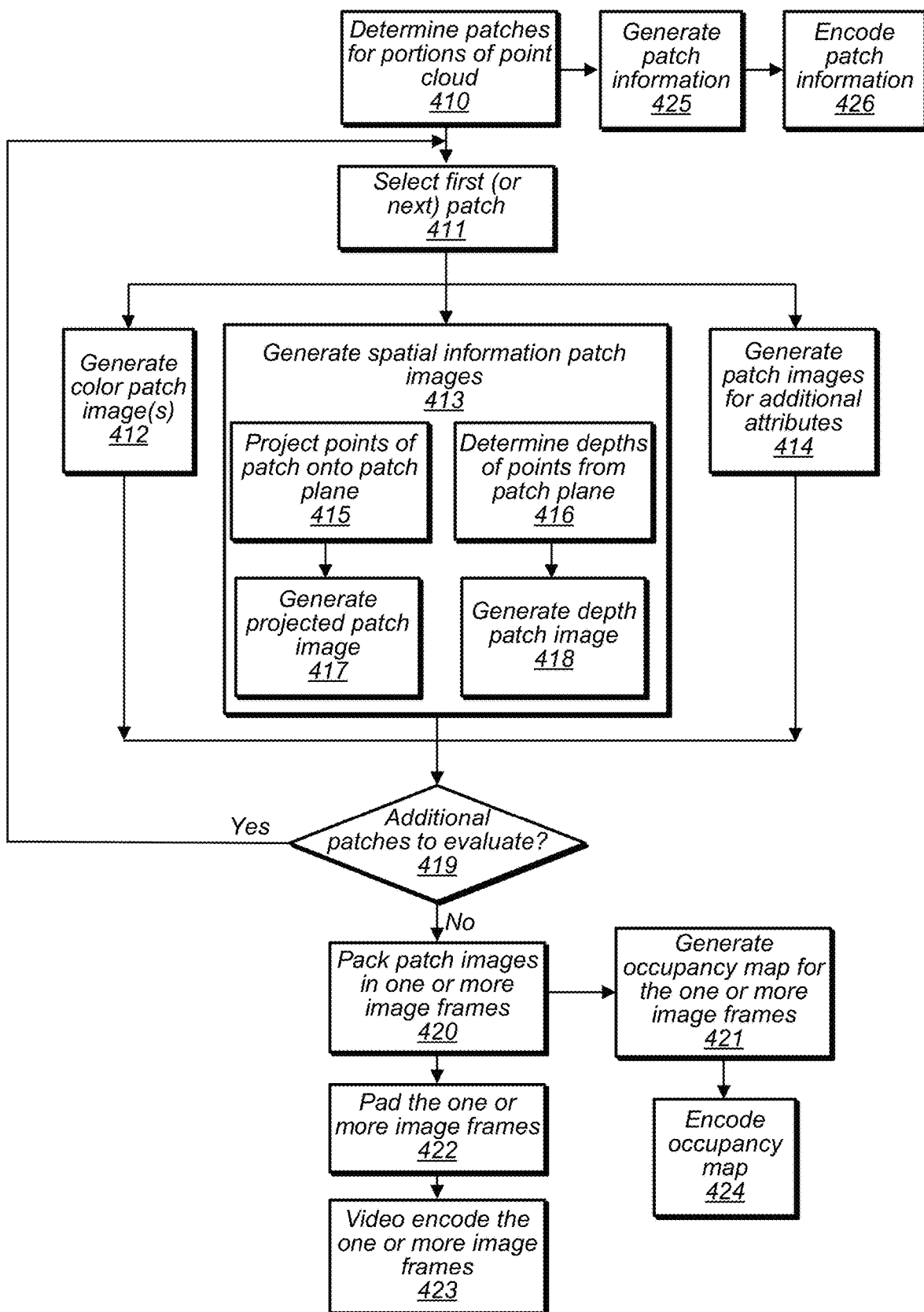
FIG. 4C illustrates patch images being generated and packed into an image frame to compress attribute and spatial information of a point cloud, according to some embodiments.

FIG. 4C illustrates patch images being generated and packed into an image frame to compress attribute and spatial information of a point cloud, according to some embodiments.

At 410, patches are determined for portions of point cloud. For example patches may be determined as described above. At 425 patch information for the patches may be generated and at 426, may be encoded to be sent to a decoder. In some embodiments, encoded patch information may be separately encoded from one or more image frames comprising packed patch images.

At 411, a first patch (or next patch is selected). At 412 a color patch image is generated for the points of the point cloud included in the patch. At 414, one or more addition attribute images, such as a texture attribute image is generated for the points of the point cloud included in the patch.

At 413, spatial information images are generated for the points of the point cloud included in the patch. In some embodiments, to generate the spatial information images, the points of the point cloud are projected, at 415, onto a patch plane perpendicular to a normal vector normal to a surface of the point cloud at the patch location. At 417 a first spatial image is generated for the patch based on the points being projected on the patch plane at 415. In addition, depth information for the points of the patch relative to the patch plane is determined at 416, and at 418 a depth patch image is generated based on the depth information determined at 416.

At 419, it is determined whether there are additional patches for which patch images are to be generated. If so, the process reverts to 411 for the next patch. If not, at 420 the patch images for the patches are packed into one or more image frames. In some embodiments, patch images for respective patches may be packed before patch images are determined for other patches. At 421, an occupancy map is generated based on where the patch images were placed when being packed into the one or more image frames. At 424, the occupancy map is encoded.

At 422, spaces in the one or more image frames that are not occupied by patch images are padded.

At 423, the one or more image frames are video encoded, such as in accordance with a high efficiency video coding (HEVC) standard.

Figure 4D:
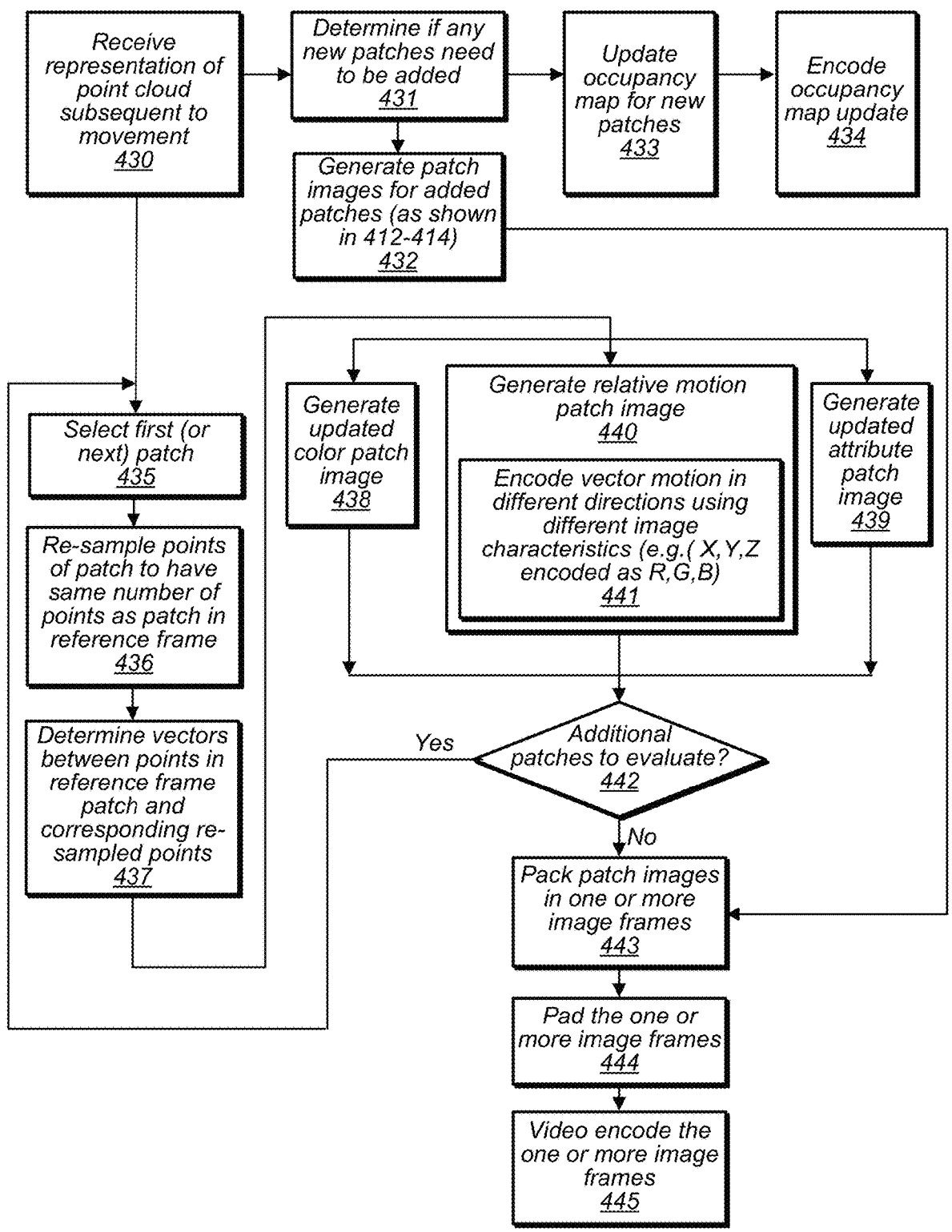
FIG. 4D illustrates patch images being generated and packed into an image frame to compress attribute and spatial information of a moving or changing point cloud, according to some embodiments.

FIG. 4D illustrates patch images being generated and packed into an image frame to compress attribute and spatial information of a moving or changing point cloud, according to some embodiments.

At 430, point cloud information for a previously encoded point cloud is received wherein the point cloud information represents a subsequent version of the previously encoded point cloud. For example, the subsequent version may be a representation of the point cloud at a subsequent moment in time, wherein the point cloud is moving or changing as time progresses.

At 431, it is determined if any new patches need to be determined for the point cloud. For example, an object not currently in the previously encoded point cloud may have been added to the point cloud. For example, the point cloud may be a point cloud of a road and a ball may have entered into the road. If there is a need to add a new patch, the occupancy map is updated at 433 to include the new patch and encoded at 434. Also, at 432 patch images are generated for the new patch in similar manner as described in 412-414. The generated patch images are included in packing at 443.

At 435, a first or next patch of the patches generated for the reference (previous) point cloud is selected. At 436, the points of the patch are re-sampled as described herein. At 437 motion vectors for the points included in the selected patch between the reference point cloud and the current point cloud are determined. At 440 the motion vectors are used to generate a relative motion patch image. For example, in some embodiments, generating a relative motion patch image may comprise, encoding, at 441, vector motion in different directions using different image characteristics, as described herein. At 438 an updated color patch image is generated. In some embodiments, the updated color patch image may encode residual values indicating differences in colors of the points of the point cloud included in the patch between the reference point cloud and the current point cloud. In a similar manner, at 439, other attribute update patch images may be generated.

At 442, it is determined whether there are additional patches to be evaluated. If so, the process reverts to 435 for the next patch. If not, at 443 the patch images for the patches are packed into one or more image frames. In some embodiments, patch images for respective patches may be packed before patch images are determined for other patches.

At 444, spaces in the one or more image frames that are not occupied by patch images are padded.

At 445, the one or more image frames are video encoded, such as in accordance with a high efficiency video coding (HEVC) standard.

Figure 4E:
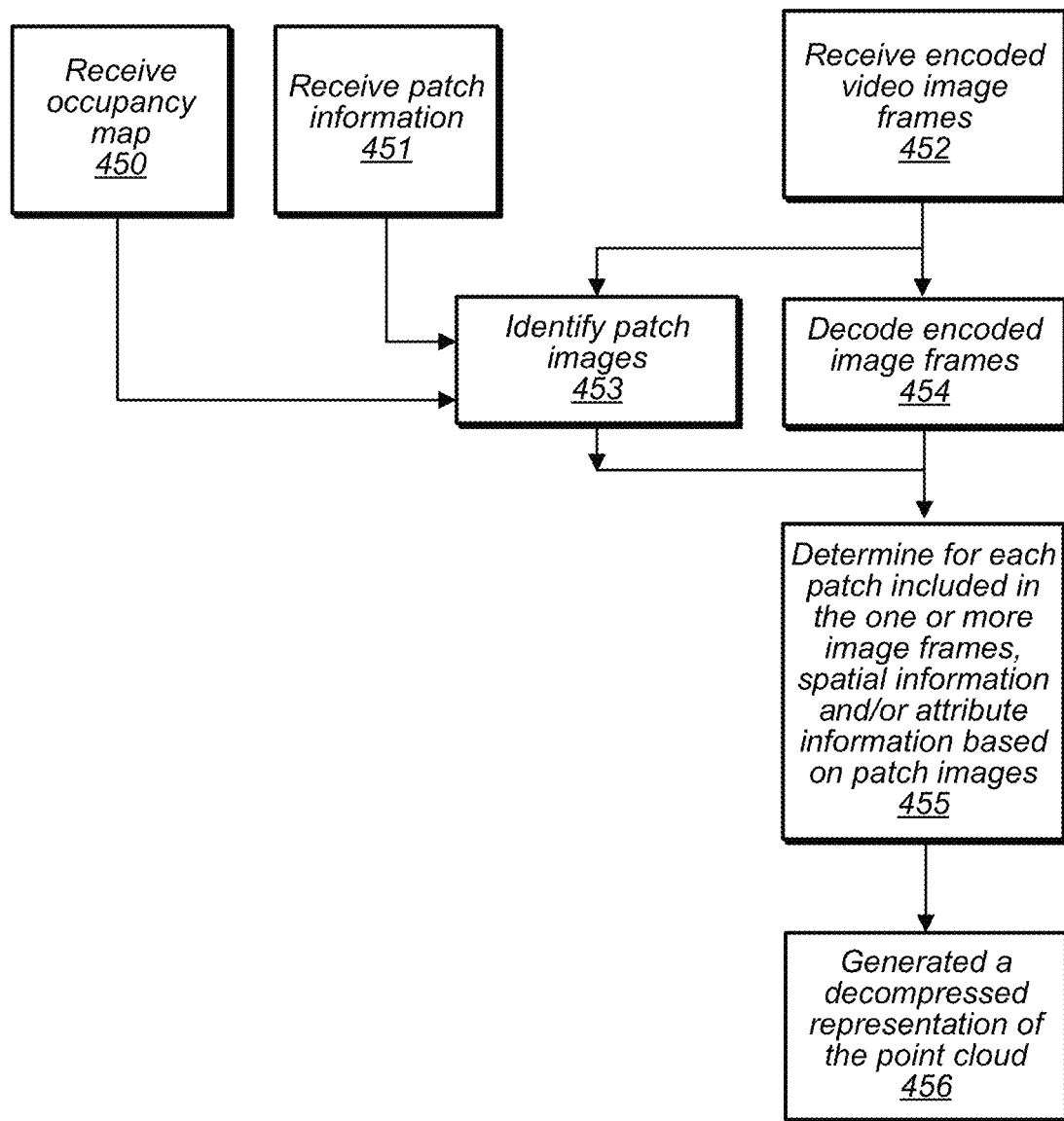
FIG. 4E illustrates a decoder receiving image frames comprising patch images, patch information, and an occupancy map, and generating a decompressed representation of a point cloud, according to some embodiments.

FIG. 4E illustrates a decoder receiving image frames comprising patch images, patch information, and an occupancy map, and generating a decompressed representation of a point cloud, according to some embodiments.

At 450, an occupancy map is received by a decoder, at 451 patch information is received by the decoder. In some embodiments the occupancy map and the patch information may be encoded and the decoder may decode the occupancy map and the patch information (not shown). At 452, the decoder receives one or more encoded video image frames. At 452 the decoder identifies patch images in the one or more encoded video image frames and at 454 the decoder decodes the encoded video image frames. In some embodiments, the decoder may utilize the occupancy map and the patch information to identify active and non-active portions of the one or more encoded video images and may adjust one or more decoded parameters used to decode the encoded video images based on whether portions, e.g. blocks, sub-blocks, pixels, etc. comprise active or non-active information.

At 455, the decoder determines spatial information and/or attribute information for the points of the respective patches and at 456 generates a decompressed representation of the point cloud encoded in the one or more encoded video images.

In some embodiments, active and non-active portions of an image frame may be indicated by a "mask." For example, a mask may indicate a portion of an image that is a pad portion or may indicate non-active points of a point cloud, such as points that are hidden from view in one or more viewing angles.

In some embodiments, a "mask" may be encoded along with patch images or projections. In some embodiments, a "mask" may show "active/available" points and "non-active/non-available" points in space. In some embodiments, a mask may be independent from a texture and a depth patch image. In some embodiments, a mask may be combined with other information, such as a texture or depth patch image. For example, by indicating that certain values in a signal range correspond to active points, e.g. values above 16 and below 235 in an 8 bit image, and that other values correspond to non-active points, e.g. values below 16 or values above 235 in an 8 bit image. In some embodiments, additional considerations may be taken to avoid or reduce contamination between active and non-active regions. For example, it may be necessary to make use of lossless or visually lossless coding at the boundaries between active and non-active regions.

In some embodiments, a mask may be utilized in a variety of ways for improving coding efficiency. For example, a mask may be used with projection methods such as cylindrical, spherical or multiple projection as wells as decomposition into patches. In addition, a mask may be used with a cubic projection method.

FIG. 4F illustrates an encoder, adjusting encoding based on one or more masks for a point cloud, according to some embodiments.

At 462, an encoder receives a point cloud. At 464, the encoder generate multiple projections or patch images as described herein, for the received point cloud. At 466, the encoder determines one or more masks. The masks may be hidden points, padded portions of an image frame, points not viewable from a particular view-point, etc. At 468, the encoder adjusts one or more encoding parameters based on the masks. For example the encoder may adjust a budget allocated to masked portions. Additional adjustments an encoder may perform are described. At 468, the encoder encodes a compressed point cloud, for example via one or more video encoded image frames.

FIG. 4G illustrates a decoder, adjusting decoding based on one or more masks for a point cloud, according to some embodiments.

At 470, a decoder receives an encoded point cloud. At 472, the decoder determines one or more masks for portions of the encoded point cloud. For example the encoder may determine portions of image frames representing the compressed point cloud correspond to padding. Or, for a particular view of the point cloud being rendered by the decoder, the decoder may determine that one or more points of the compressed point cloud are not viewable from the particular point of view. In some embodiments, mask information may indicate which points are hidden when the point cloud is viewed from particular points of view. At 474, the decoder adjusts one or more decoding parameters based on the masks. Adjustments that may be made by a decoder based on active/non-active regions or points (e.g. masks) are described in more detail below. At 476 the decoder decodes the compressed point cloud.

In some embodiments, a mask may be used when performing motion estimation and mode decision. Commonly distortion is computed for an entire block. However, some blocks may have blocks that contain a combination of texture data as well as empty/non visible areas. For these areas only the textured data are of interest and any distortion in the non-visible areas may be ignored. Therefore, since commonly when performing such processes as motion estimation and mode decision, a distortion computation, such as Sum of Absolute Differences (SAD) or Sum of Square Errors (SSE), is performed, a mask may be used to alter the computation to exclude distortion for the non-visible areas. For example, for the SAD case, distortion may be computed by computing the sum of absolute differences of only samples in a block that correspond to a visible area in a current image. All other samples may be ignored during the computation. In some embodiments, distortion may be normalized at the pixel level thus avoiding having to consider blocks with different number of pixels.

In some embodiments, instead of only considering non-visible samples, samples that are adjacent to non-visible samples, or samples identified to correspond to different projections (but are placed when encoding within the same coding block) may be assigned different weights. For example samples in particular blocks could be considered more important for subjective quality, and a lower distortion tolerance may be assigned. In such case, the weighting for those samples may be increased, thus biasing decisions where the distortion for those samples is lower. Knowledge also that different samples in the same block of a particular size M×N during motion estimation or mode decision correspond to different objects, may also help with the determination of the block partitioning mode, e.g. the encoder could make an early decision (based potentially on a preliminary search) on whether different partitioning could/should be used.

In some embodiments, masks may be used for rate control and rate allocation. For example, it may be desirable that blocks that correspond to areas that contain both visible and non-visible samples be encoded at a different, and some times higher, quality than blocks that contain only visible samples. This is done so as to avoid leakage between visible and not visible samples and ensure the best quality at the point-clouds "boundaries". Different quality may also be assigned based on depth information, which may also be available on the encoder. Flatter areas may tolerate much more distortion than areas with considerable variance in depth. Control of quality may be performed by adjusting quantization parameters/factors, but also by adjusting other parameters such as the lagrangian multiplier during mode decision, using different quantization matrices if available, enabling and/or adjusting quantization thresholding and the size and/or shapes of zonal quantization.

Quantization may also be adjusted according to the projection method used. If, for example an equirectangular projection method was used to project the object onto a sphere and then onto a 2D plane, it might be desirable to increase quantization on the top and bottom boundaries, and slowly decrease it when moving towards the center/equator. This may help compensate for some of the differences in resolution allocation when using a particular projection method. Different adjustments may also be made to the different color components, again based on similar assumptions, and in consideration again of the mask information.

Quantization may also be performed while considering whether a sample is a visible or a non-visible sample. For example, if a strategy involves the use of dynamic programming/trellis quantization methods for determining the value of a quantized coefficient. In such embodiments, an impact in distortion of a quantized coefficient, as well as its impact on bitrate at multiple reconstruction points may commonly be computed. This may be done for all coefficients while considering their bitrate interactions. Finally a decision may be made for all coefficients jointly by selecting the quantized values that would together result in the best rate distortion performance. In some embodiments, the visible and non-visible areas may be considered when computing such metrics.

Similar to the motion estimation and mode decision, SAO techniques also commonly compute the resulting distortion for each possible mode or SAO value that may be used. Again, the decision may exclude non-visible samples, or prioritize, with different weights samples that are close to non-visible samples or samples that correspond to areas with considerably varying depth.

In some embodiments, masks may be used in any other coding process that may involve a distortion computation.

In some embodiments, masks may be used in preprocessing/prefiltering. For example, samples may be prefiltered based on their proximity to non-visible samples so as to reduce the possibility of artifacts and/or remove noise that may make encoding more difficult. Any form of Prefiltering, including spatio-temporal filters, may be used.

In some embodiments, prefiltering may be applied to both texture as well as depth information.

Decisions in quantization parameters could also be made at the picture level (temporally) given the amount of visible/non-visible samples and depth variance on different pictures. Such decisions could be quite useful, for example, in a multi-pass coding system where analyze the entire sequence is first analyzed to determine the complexity and relationship of each frame with other frames. The coding parameters may then be decided that will be used for that frame in relationship to all other frames and given an expected quality or bitrate target. Similar decisions may also be made, not only for quantization parameters, but also for the picture coding types (i.e. I, P, or B), structures (e.g. hierarchical or not coding of N frames that follows a particular coding order of frames), references to use, weighting parameters, etc.

Encoding and Decoding (Normative Concepts)

Since a mask is likely to be available losslessly or visually losslessly at the decoder, as well as the depth information, this information may also be used at the decoder (and of course at the encoder) to further improve quality.

For example, deblocking and sample adaptive offset (SAO), as well as adaptive loop filtering (ALF) and deringing (in codecs that support such mechanisms), with exclusion of non-visible samples, samples that correspond to different projections, or samples with very different depth characteristics may use masking information. Instead, it may be desirable to only consider for such filtering methods samples that correspond to the same projection and are not so far from each other (depth wise). This may reduce blockiness and/or other artifacts that these methods try to mitigate. Other future types of in-loop post filtering may also be performed in a similar manner.

As another example, out of loop post filtering with visible/non-visible/different area segmentation may utilize masking information.

Implicit adjustment of QP quality parameters based on a certain percentage of visible/non-visible samples within a block may be performed. This may reduce signaling of coding parameters if such switching occurs frequently in a bit stream.

Adjustment of the transform type based on the percentage of visible/non-visible samples may be performed, including the consideration of shape adaptive discrete cosine transforms (DCT transforms).

Adjustment of overlapped block motion compensation techniques may utilize masking information, if existing in a codec, to mask away non-visible samples. A similar consideration may be performed for block motion compensation and/or intra prediction (including an intra block copy method). Samples that are considered visible may be considered when constructing a prediction signal, including also when interpolating to perform subpixel motion compensation or when performing bi-prediction. Masks from the current picture may be considered, but if desired, both the masks from the current picture as well as the masks corresponding to the reference pictures could be considered. Such considerations may be made adaptive at the encoder, through some form of signaling, i.e. at the sequence, picture, tile, slice, or even CTU/block level.

In some embodiments, clipping of the final value based on the mask or depth information may be performed.

In some embodiments, similar other prediction methods that may exist inside a codec (e.g. in AV1 or the project that may be developed in the future by MPEG in its JVET activity) may be similarly adjusted or constrained based on the existence (and amount) of visible and non-visible points, and points corresponding to different projections.

In some embodiments, different control/adjustments may be applied to different color components as well as to the depth information.

Hierarchical Level of Detail Compression

In some embodiments, spatial information may be used to build a hierarchical Level of detail (LOD) structure. The LOD structure may be used to compress attributes associated with a point cloud. The LOD structure may also enable advanced functionalities such as progressive/view-dependent streaming and scalable rendering. In some embodiments, an encoder that applies a LOD structure to compress a point cloud be used to encode spatial information and/or attribute information of a point cloud as described in FIGS. 1A-1D.

Figure 5:
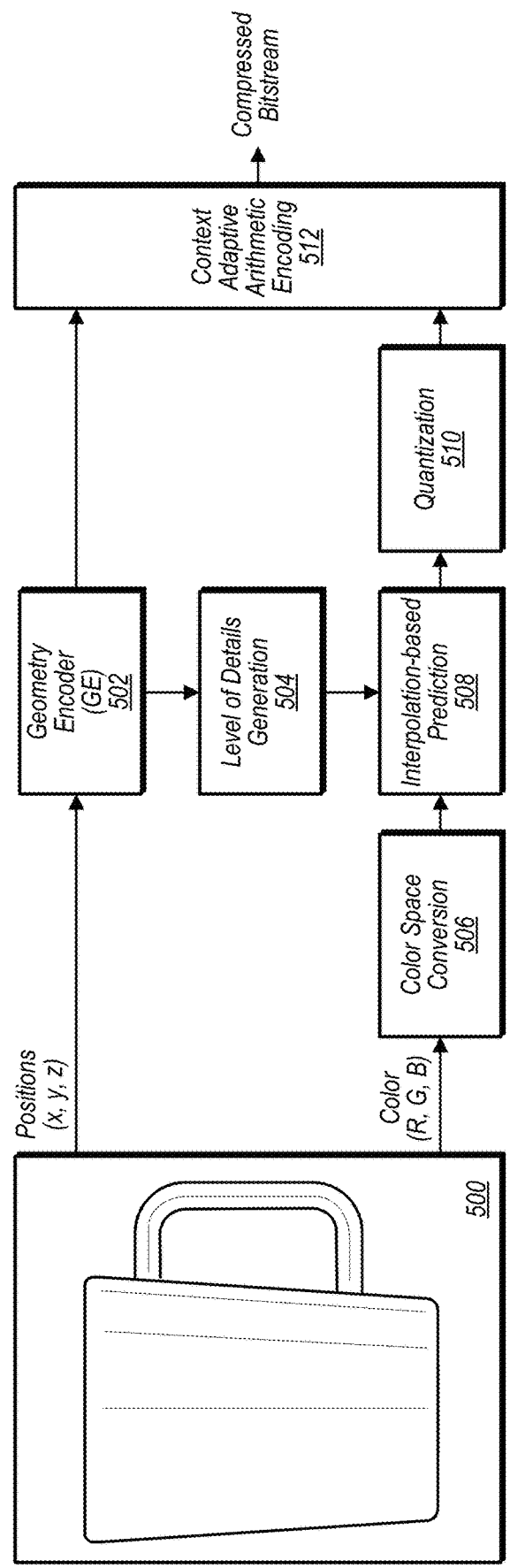
FIG. 5 illustrates an example encoder that generates a hierarchical LOD structure, according to some embodiments.

FIG. 5 illustrates an example encoder that generates a hierarchical LOD structure, according to some embodiments. In some embodiments, geometry information may be used to efficiently predict attribute information. The hypothesis behind this, is that the lower the distance between two points in terms of positions, the higher the correlation of their attributes. In FIG. 5 the compression of color information is illustrated. However, a LOD structure may be applied to any attribute (e.g., reflectance) associated with a point cloud. Note that a pre-encoding step which applies space conversion (e.g., color space conversion) or updates the data to make the data better suited for compression may be performed depending on the attribute to be compressed.

In some embodiments, attribute information compression proceeds as follows:

For example, let Geometry (G)={Point-P(0), P(1), . . . P(N−1)} be reconstructed point cloud positions generated by a spatial decoder (geometry decoder GD) after decoding a compressed geometry bit stream produced by a spatial encoder (geometry encoder GE), such as GE 502. For example, the spatial information may describe locations of points in 3D space, such as X, Y, and Z coordinates of the points that make up mug 500. Note that spatial information may be available to both encoder and decoder. For example various techniques, such as K-D tree compression, may be used to compress and/or encode spatial information for mug 500 and the spatial information may be sent to a decoder with or in addition to compressed attribute information for attributes of the points that make up a point cloud for mug 500.

In some embodiments, a deterministic re-ordering process may be applied on both the encoder and the decoder side in order to organize the points in a set of Level of Details (LoD). For example, levels of detail may be generated at 504. Note that information does not need to be included in the bit stream to generate such LOD structure, except the parameters of the LOD generation algorithm, for example:
  i. The maximum number of LODs to be generated denoted N (e.g., N=6),
  ii. The sampling initial sampling distance D0 (e.g., D=64), and
  iii. The sampling distance update factor f (e.g., ½).

In some embodiments, the parameters N, DO and f, may be provided by a user or determined automatically by using an optimization procedure, for example. These parameters may be fixed or adaptive.

In some embodiments, LOD generation proceeds as follows:
  i. First, points of G (geometry points, e.g. the points of the point cloud organized according to the spatial information) are marked as non-visited and the set of visited points V is empty.
  ii. The LOD generation may proceed iteratively. At each iteration j, the LOD(j) may be generated as follows:
    1. The sampling distance for the current LOD, denoted D(j) may be set as follows:
      a. If j=0, then D(j)=DO.
      b. If j>0 and j<N, then D(j)=D(j−1)*f.
      c. if j=N, then D(j)=0.
    2. The LOD generation iterates over all the points of G.
      a. At the iteration i
        i. if the point P(i) has been visited then it is ignored and the algorithm jumps to the iteration (i+1).
        ii. Otherwise, the distance D(i, V) of P(i) to V, defined as the minimum distance from P(i) over all the points of V, is computed. If V is empty, is set D(i, V) 0. If D(i, V) is strictly higher than a parameter DO, then the point is ignored and the LoD generation jumps to the iteration (i+1). Otherwise, P(i) is marked as visited and added to V.
      b. This process may be repeated until all the points of G are traversed.
    3. The set of points added to V during the iteration j describe the refinement level R(j).
    4. The LOD(j) may be obtained by taking the union of all the refinement levels R(0), R(1), . . . , R(j).
  iii. This process may be repeated until all the LODs are generated or all the vertices have been visited.

FIG. 6A illustrates an example LOD, according to some embodiments. Note that the LOD generation process may generate uniformly sampled approximations (or levels of detail) of the original point cloud, that get refined as more and more points are included. Such a feature makes it particularly adapted for progressive/view-dependent transmission and scalable rendering. For example, 604 may include more detail than 602, and 606 may include more detail than 604. Also, 608 may include more detail than 602, 604, and 606.

The hierarchical LOD structure may be used to build an attribute prediction strategy. For example, in some embodiments the points may be encoded in the same order as they were visited during the LOD generation phase. Attributes of each point may be predicted by using the k-nearest neighbors that have been previously encoded. In some embodiments, "K" is a parameter that may be defined by the user or may be determined by using an optimization strategy. "K" may be static or adaptive. In the later case, extra information describing the parameter change may be included in the bit stream.

In some embodiments, different prediction strategies may be used. For example, one of the following interpolation strategies may be used, as well as combinations of the following interpolation strategies, or adaptively switch between the different interpolation strategies, such as: inverse-distance interpolation, barycentric interpolation, natural neighbor interpolation, moving least squares interpolation, or other suitable interpolation techniques. For example, interpolation based prediction may be performed at 508. In some embodiments, a color space may be converted, at 506, prior to performing interpolation based prediction.

In some embodiments, quantization may further be applied to attribute information. For example quantization is performed at 510. Quantization techniques may include uniform quantization, uniform quantization with a dead zone, non-uniform/non-linear quantization, trellis quantization, or other suitable quantization techniques.

In some embodiments, LOD compression may be used to compress dynamic point clouds as follows:

Let FC be the current point cloud frame and RF be the reference point cloud.

Let M be the motion field that deforms RF to take the shape of FC.
  i. M may be computed on the decoder side and in this case information may not be encoded in the bit stream.
  ii. M may be computed by the encoder and explicitly encoded in the bit stream
    1. M may be encoded by applying a hierarchical compression technique as described herein to the motion vectors associated with each point of RF (e.g. the motion of RF may be considered as an extra attribute).
    2. M may be encoded as a skeleton/skinning-based model with associated local and global transforms.
    3. M may be encoded as a motion field defined based on an octree structure, which is adaptively refined to adapt to motion field complexity.
    4. M may be described by using any suitable animation technique such as key-frame-based animations, morphing techniques, free-form deformations, key-point-based deformation, etc.
  iii. Let RF' be the point cloud obtained after applying the motion field M to RF. The points of RF' may be then used in the attribute prediction strategy by considering not only the k nearest neighbor points of FC but also those of RF'.

Furthermore, attribute correction values may be determined based on comparing the interpolation-based prediction values determined at 508 to original non-compressed attribute values. The attribute correction values may further be quantized at 510 and the quantitated attribute correction values, encoded spatial information (output from the geometry encoder) and any configuration parameters used in the prediction may be encoded at 512 using a context adaptive arithmetic encoding technique. The compressed point cloud may then be provided to a decoder that performs similar level of detail generation and interpolation based prediction to recreate the original point cloud based on the quantitated attribute correction values, encoded spatial information (output from the geometry encoder) and the configuration parameters used in the prediction at the encoder.

FIG. 6B illustrates an example compressed point cloud file comprising LODs, according to some embodiments. Level of detail attribute information file 650 includes configuration information 652, point cloud data 654, and level of detail point attribute correction values 656. In some embodiments, level of detail attribute information file 650 may be communicated in parts via multiple packets. In some embodiments, not all of the sections shown in the level of detail attribute information file 650 may be included in each packet transmitting compressed attribute information. In some embodiments, a level of detail attribute information file, such as level of detail attribute information file 650, may be stored in a storage device, such as a server that implements an encoder or decoder, or other computing device.

Figure 7A:
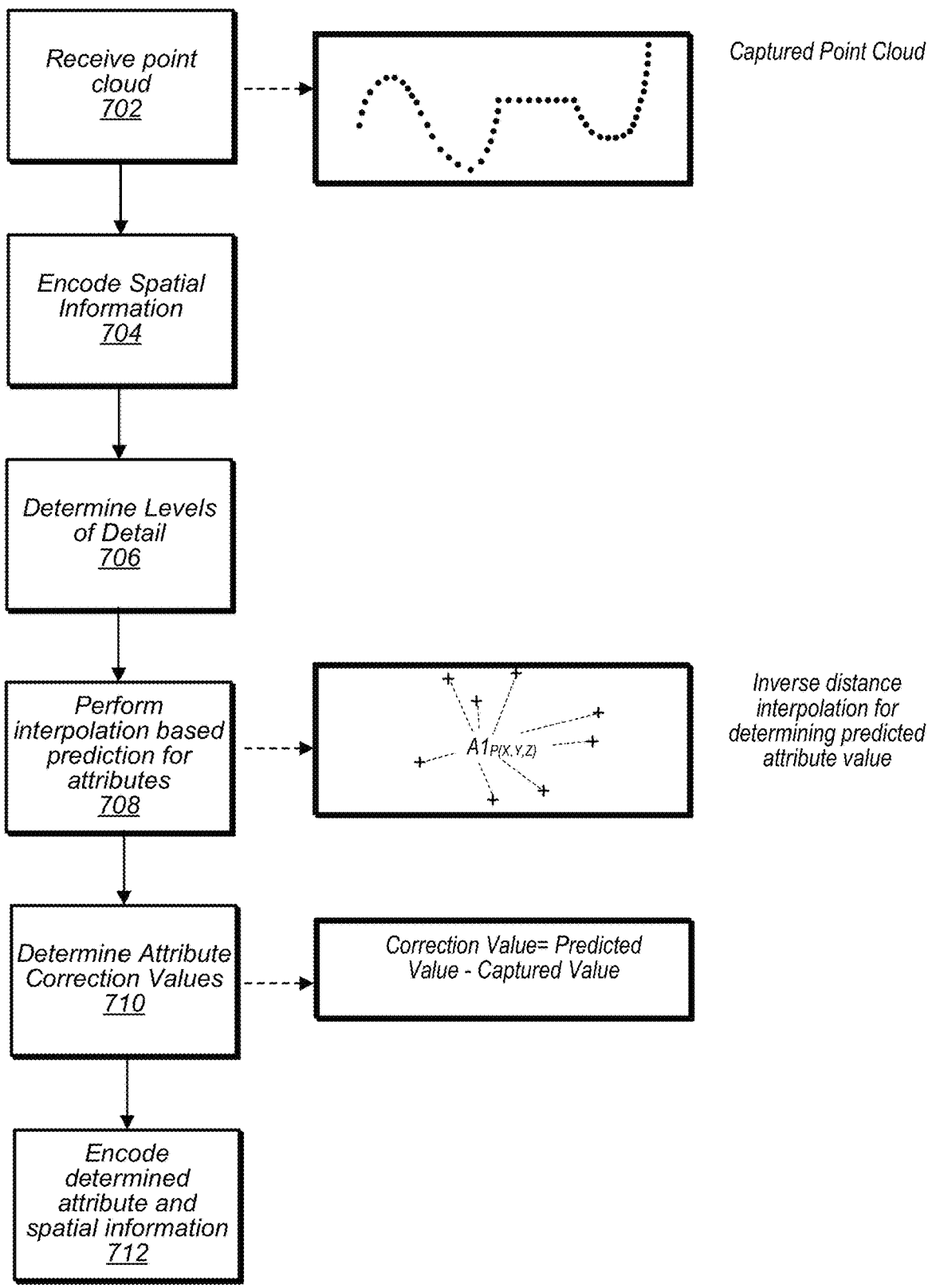
FIG. 7A illustrates a method of encoding attribute information of a point cloud, according to some embodiments.

FIG. 7A illustrates a method of encoding attribute information of a point cloud, according to some embodiments.

At 702, a point cloud is received by an encoder. The point cloud may be captured, for example by one or more sensors, or may be generated, for example in software.

At 704, spatial or geometry information of the point cloud is encoded as described herein.

At 706, one or more level of details are generated, as described herein.

At 708, an interpolation based prediction is performed to predict attribute values for the attributes of the points of the point cloud, as described herein.

At 710, attribute correction values are determined based on comparing the predicted attribute values to original attribute values, as described herein.

At 712, attribute correction values, encoded spatial information (output from the geometry encoder) and any configuration parameters used in the prediction are encoded, as described herein.

In some embodiments, the spatial information encoded at 712 may include spatial information for multiple or all levels of detail of the point cloud, or may include spatial information for a single level of detail or fewer than all levels of detail of the point cloud. In some embodiments, level of detail attribute information may be sequentially encoded by an encoder. For example, an encoder may make available a first level of detail before encoding attribute information for one or more additional levels of detail.

In some embodiments, an encoder may further encode one or configuration parameters to be sent to a decoder, such as any of the configuration parameters shown in configuration information 652 of compressed attribute information file 650. For example, in some embodiments, an encoder may encode a number of levels of detail that are to be or are encoded for a point cloud. The encoder may also encode a sampling distance update factor, wherein the sampling distance is used to determine which points are to be included in a given level of detail.

Figure 7B:
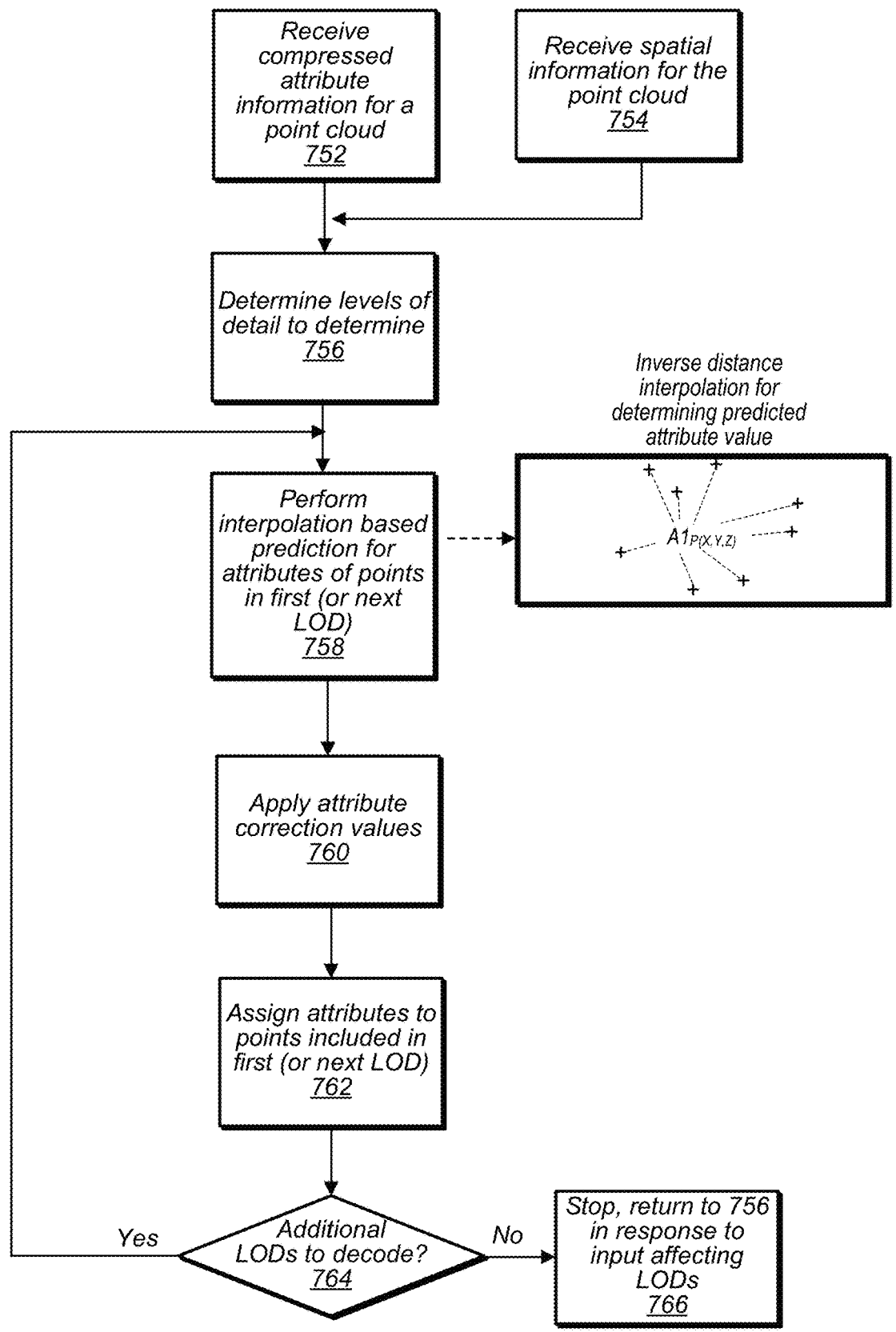
FIG. 7B illustrates a method of decoding attribute information of a point cloud, according to some embodiments.

FIG. 7B illustrates a method of decoding attribute information of a point cloud, according to some embodiments.

At 752, compressed attribute information for a point cloud is received at a decoder. Also, at 754 spatial information for the point cloud is received at the decoder. In some embodiments, the spatial information may be compressed or encoded using various techniques, such as a K-D tree, and the decoder may decompress and/or decode the received spatial information at 754.

At 756, the decoder determines a number of levels of detail to determine. The number of levels of detail to decode may be determined based on a viewing mode of the point cloud. For example, a point cloud being viewed in a preview mode may require fewer levels of detail to be determined than a point cloud being viewed in a full view mode. Also, a location of a point cloud in a view being rendered may be used to determine a number of levels of detail. For example, a point cloud may represent an object such as the coffee mug shown in FIG. 41. If the coffee mug is in a foreground of a view being rendered more levels of detail may be determined for the coffee mug. However, if the coffee mug is in the background of a view being rendered, fewer levels of detail may be determined for the coffee mug. In some embodiments, a number of levels of detail to determine for a point cloud may be determined based on a data budget allocated for the point cloud.

At 758 points included in the first level of detail (or next level of detail) being determined may be determined as described herein. For the points of the level of detail being evaluated, attribute values of the points may be predicted based on an inverse distance weighted interpolation based on the k-nearest neighbors to each point being evaluated, where k may be a fixed or adjustable parameter.

At 760, attribute correction values included in the compressed attribute information for the point cloud may be decoded for the current level of detail being evaluated and may be applied to correct the attribute values predicted at 758.

At 762, the corrected attribute values determined at 760 may be assigned as attributes to the points of the first level of detail (or the current level of detail being evaluated). In some embodiments, the attribute values determined for subsequent levels of details may be assigned to points included in the subsequent levels of detail while attribute values already determined for previous levels of detail are retained by the respective points of the previous level(s) of detail.

At 764 it is determined if there are additional levels of detail to decode. If so, the process returns to 758 and is repeated for the next level of detail to decode. If not the process is stopped, but may resume at 756 in response to input affecting the number of levels of detail to determine, such as change in view of a point cloud or a zoom operation being applied to a point cloud being viewed, as a few examples of an input affecting the levels of detail to be determined.

In some embodiments, the spatial information received at 754 may include spatial information for multiple or all levels of detail of the point cloud, or may include spatial information for a single level of detail or fewer than all levels of detail of the point cloud. In some embodiments, level of detail attribute information may be sequentially received by a decoder. For example, a decoder may receive a first level of detail and generate attribute values for points of the first level of detail before receiving attribute information for one or more additional levels of detail.

Figure 8:
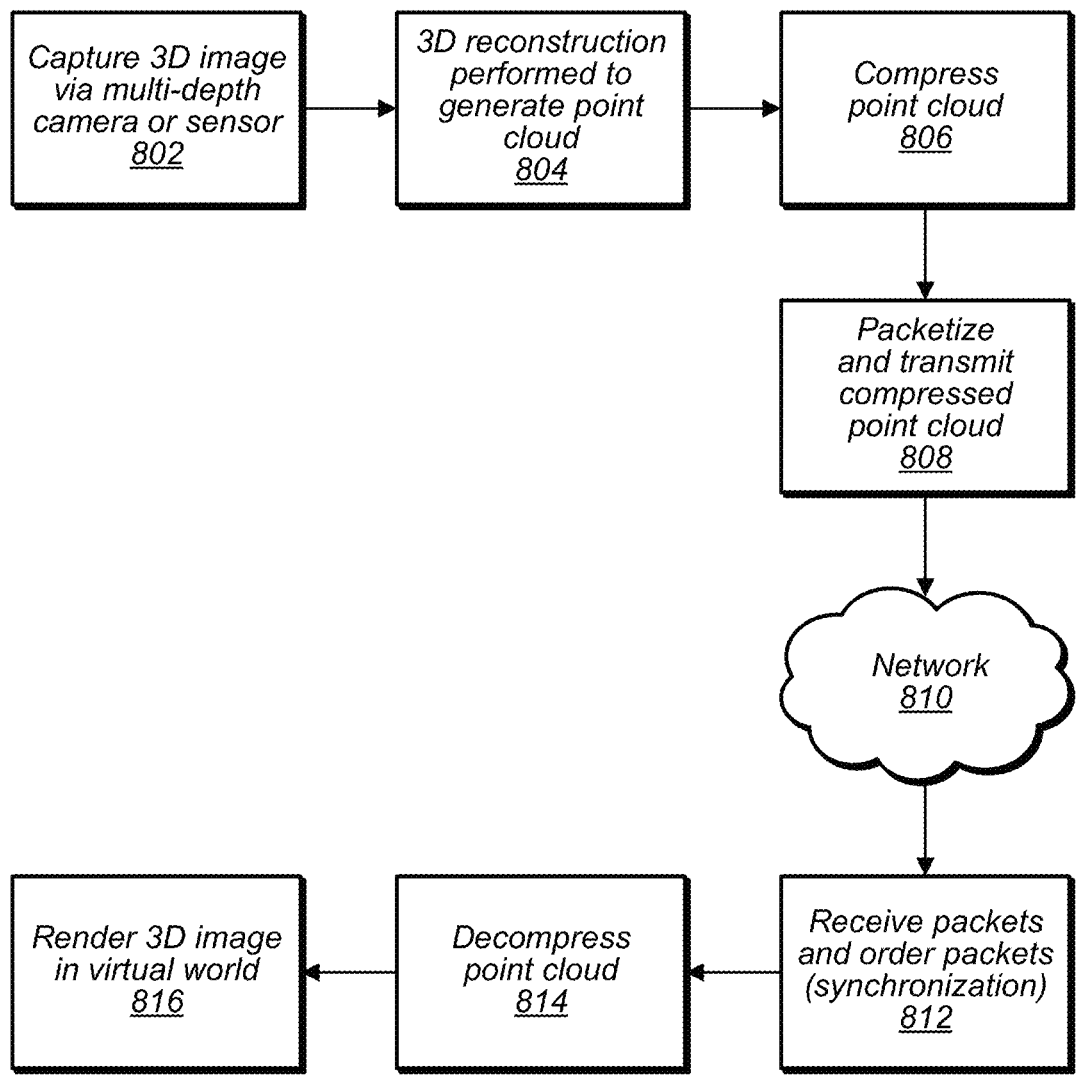
FIG. 8 illustrates compressed point cloud information being used in a 3-D telepresence application, according to some embodiments.

FIG. 8 illustrates compressed point clouds being used in a 3-D telepresence application, according to some embodiments.

In some embodiments, a sensor, such as sensor 102, an encoder, such as encoder 104, and a decoder, such as decoder 116, may be used to communicate point clouds in a 3-D telepresence application. For example, a sensor, such as sensor 102, at 802 may capture a 3D image and at 804, the sensor or a processor associated with the sensor may perform a 3D reconstruction based on sensed data to generate a point cloud.

At 806, an encoder such as encoder 104 may compress the point cloud and at 808 the encoder or a post processor may packetize and transmit the compressed point cloud, via a network 810. At 812, the packets may be received at a destination location that includes a decoder, such as decoder 116. The decoder may decompress the point cloud at 814 and the decompressed point cloud may be rendered at 816. In some embodiments a 3-D telepresence application may transmit point cloud data in real time such that a display at 816 represents images being observed at 802. For example, a camera in a canyon may allow a remote user to experience walking through a virtual canyon at 816.

Figure 9:
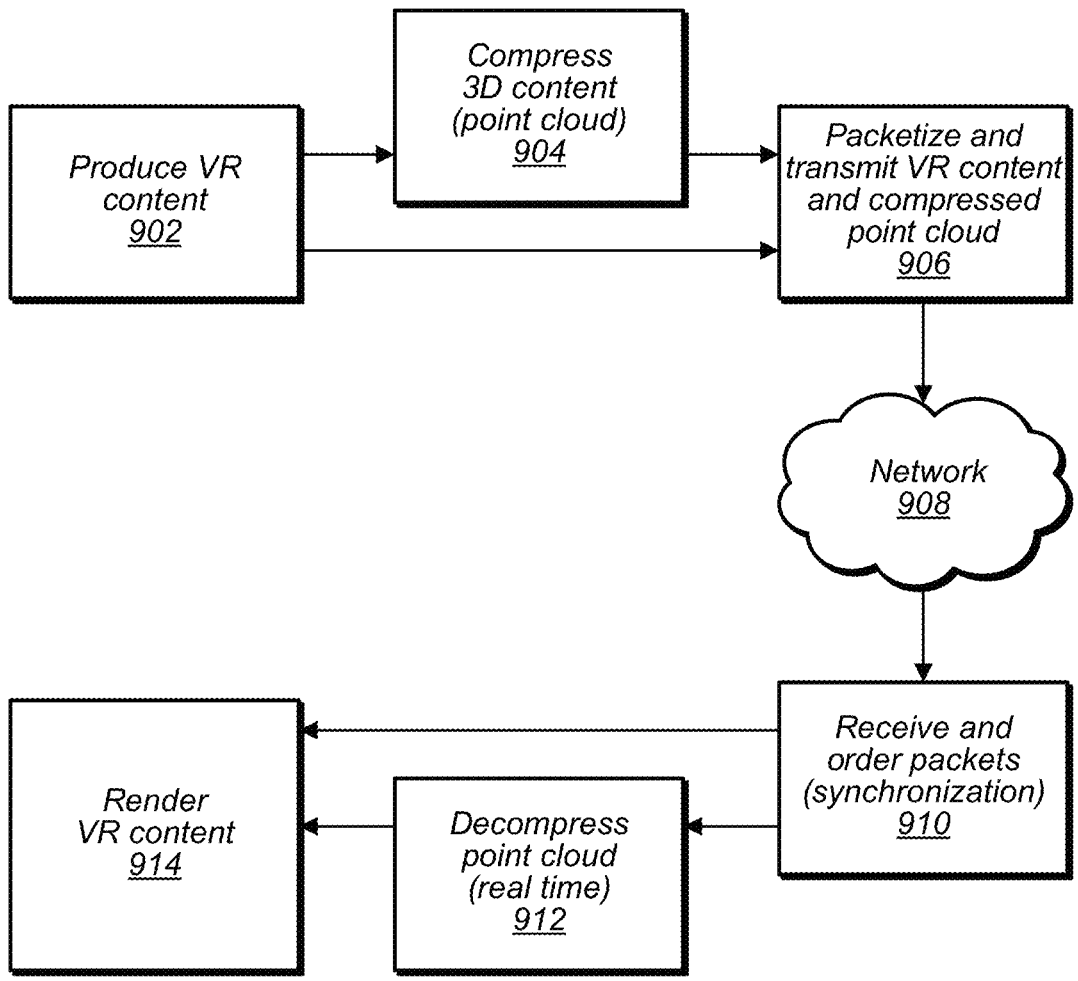
FIG. 9 illustrates compressed point cloud information being used in a virtual reality application, according to some embodiments.

FIG. 9 illustrates compressed point clouds being used in a virtual reality (VR) or augmented reality (AR) application, according to some embodiments.

In some embodiments, point clouds may be generated in software (for example as opposed to being captured by a sensor). For example, at 902 virtual reality or augmented reality content is produced. The virtual reality or augmented reality content may include point cloud data and non-point cloud data. For example, a non-point cloud character may traverse a landscape represented by point clouds, as one example. At 904, the point cloud data may be compressed and at 906 the compressed point cloud data and non-point cloud data may be packetized and transmitted via a network 908. For example, the virtual reality or augmented reality content produced at 902 may be produced at a remote server and communicated to a VR or AR content consumer via network 908. At 910, the packets may be received and synchronized at the VR or AR consumer's device. A decoder operating at the VR or AR consumer's device may decompress the compressed point cloud at 912 and the point cloud and non-point cloud data may be rendered in real time, for example in a head mounted display of the VR or AR consumer's device. In some embodiments, point cloud data may be generated, compressed, decompressed, and rendered responsive to the VR or AR consumer manipulating the head mounted display to look in different directions.

In some embodiments, point cloud compression as described herein may be used in various other applications, such as geographic information systems, sports replay broadcasting, museum displays, autonomous navigation, etc.

Example Computer System

Figure 10:
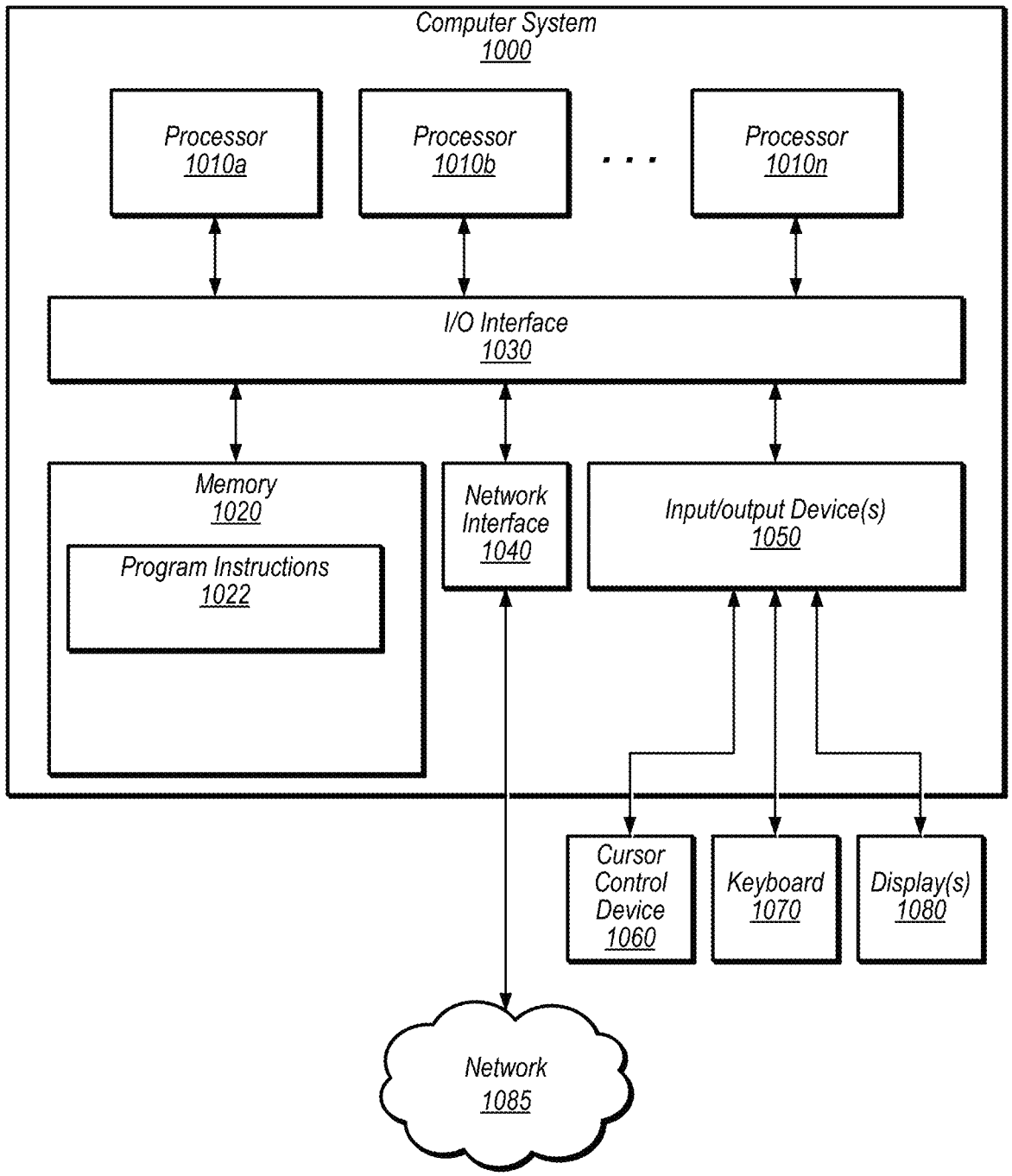
FIG. 10 illustrates an example computer system that may implement an encoder or decoder, according to some embodiments.

FIG. 10 illustrates an example computer system 1000 that may implement an encoder or decoder or any other ones of the components described herein, (e.g., any of the components described above with reference to FIGS. 1-9), in accordance with some embodiments. The computer system 1000 may be configured to execute any or all of the embodiments described above. In different embodiments, computer system 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 1000, which may interact with various other devices. Note that any component, action, or functionality described above with respect to FIGS. 1-9 may be implemented on one or more computers configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store point cloud compression or point cloud decompression program instructions 1022 and/or sensor data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions 1022 may be configured to implement an image sensor control application incorporating any of the functionality described above. In some embodiments, program instructions and/or data may be received, sent or stored upon different types of computer-accessible media or on similar media separate from system memory 1020 or computer system 1000. While computer system 1000 is described as implementing the functionality of functional blocks of previous Figures, any of the functionality described herein may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1085 (e.g., carrier or agent devices) or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1022, which may be processor-executable to implement any element or action described above. In one embodiment, the program instructions may implement the methods described above. In other embodiments, different elements and data may be included. Note that data may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A non-transitory computer-readable medium storing program instructions, that when executed on or across one or more processors, cause the one or more processors to:
   encode spatial information for a three-dimensional (3D) representation of an object;
   generate a re-constructed 3D representation of the object based on the encoded spatial information, wherein at least some spatial locations of elements or presence of elements of the object differs between the 3D representation of the object prior to the spatial information being encoded and the re-constructed 3D representation of the object;
   determine respective differences between spatial locations of the elements of the 3D representation of the object prior to the spatial information being encoded and spatial locations for corresponding elements in the re-constructed 3D representation of the object;
   select modified attribute values to be encoded for the corresponding elements such that a level of distortion between the 3D representation of the object and the re-constructed 3D representation of the object is minimized; and
   encode modified attribute value information to be used at a decoder to generate a decoder generated re-constructed version of the object, wherein the attribute value information is based on the selected modified attribute values that minimize attribute value distortion.

2. The non-transitory computer-readable medium of claim 1, wherein the 3D representation of the object is a three-dimensional (3D) mesh.

3. The non-transitory computer-readable medium of claim 1, wherein the 3D representation of the object is a three-dimensional (3D) point cloud.

4. The non-transitory computer-readable medium of claim 1 wherein to encode the spatial information, the program instructions cause the one or more processors to:
   generate a K-D tree to be used by a decoder to re-construct a spatial organization of the elements of the object; or
   generate an Octree to be used by a decoder to re-construct a spatial organization of the elements of the object; or
   generate location correction information to be used by a decoder to re-construct a spatial organization of the elements of the object using a sub-sampled number of the elements of the object, a known or signaled prediction technique, and the location correction information.

5. The non-transitory computer-readable medium of claim 1, wherein to encode the attribute information, the program instructions cause the one or more processors to:
   assign an attribute value to at least one element of the object based, at least in part, on captured or generated attribute information for the element of the object; and
   for respective other ones of the elements of the object:
      identify a set of neighboring elements;
      determine a predicted attribute value for the respective element based, at least in part, on predicted or assigned attributes values for the neighboring elements; and
      determine an attribute correction value for the respective element, based, at least in part, on comparing the predicted attribute value for the respective element to a captured or generated attribute value for the respective element; and
   encode the assigned attribute value for the at least one element; and data indicating, for the respective other ones of the elements, the determined attribute correction values.

6. The non-transitory computer-readable medium of claim 1, wherein to determine the respective differences between locations of the elements of the 3D representation of the object prior to the spatial information being encoded and spatial locations for corresponding elements in the re-constructed 3D representation of the object, the program instructions, when executed on or across the one or more processors, cause the one or more processors to:
   determine a first distortion amount between the 3D representation of the object prior to 3D spatial and attribute data being encoded for the object and the re-constructed version of the 3D representation of the object, wherein the first distortion amount is based on comparing the re-constructed version of the 3D representation of the object to a pre-encoding version of the 3D representation of the object, and
   determine a second distortion amount between the re-constructed version of the 3D representation of the object and the 3D representation of the object prior to the 3D representation of the object being encoded, wherein the second distortion amount is based on comparing the pre-encoding version of the 3D representation of the object to the re-constructed version of the 3D representation of the object.

7. The non-transitory computer-readable medium of claim 6, wherein to select modified attribute values to be encoded for the corresponding elements such that a level of attribute value distortion between the 3D representation of the object prior to the encoding and the re-constructed version of the 3D representation of the object is minimized, the program instructions, when executed on or across the one or more processors, cause the one or more processors to, for element of the re-constructed 3D representation of the object:
   assign, if the second distortion amount is greater than the first distortion amount, the attribute value of the nearest corresponding element in the pre-encoding version of the 3D representation of the object to the corresponding element in the re-constructed version of the 3D representation of the object; and assign, if the first distortion amount is greater than the second distortion amount, to the element in the re-constructed version of the 3D representation of the object an average attribute value of a set of elements in the pre-encoding version of the 3D representation of the object that have the element in the re-constructed version of the 3D representation of the object as a nearest neighboring element.

8. The non-transitory computer-readable medium of claim 7, wherein the program instructions, when executed on or across the one or more processors, cause the one or more processors to:
iteratively perform the assigning of modified attribute values to the elements in the re-constructed 3D representation of the object and updating the first and second distortion amounts until the first or second distortion amount is reduced to be less than a threshold level of distortion.

9. The non-transitory computer-readable medium of claim 7, wherein the first and second distortion amounts are determined based on a sum of squared errors.

10. The non-transitory computer-readable medium of claim 1, wherein the attribute information is encoded according to a patch projection video encoding compression technique, a nearest neighbor prediction compression technique, or a level of detail compression technique.

11. A device, comprising:
a memory storing program instructions; and
one or more processors, wherein the program instructions, when executed on or across the one or more processors, cause the one or more processors to:
encode spatial information for a three-dimensional (3D) representation of an object;
generate a re-constructed 3D representation of the object based on the encoded spatial information, wherein at least some spatial locations of elements or presence of elements of the object differs between the 3D representation of the object prior to the spatial information being encoded and the re-constructed 3D representation of the object;
determine respective differences between locations of the elements of the 3D representation of the object prior to the spatial information being encoded and spatial locations for corresponding elements in the re-constructed 3D representation of the object;
select modified attribute values to be encoded for the corresponding elements such that a level of distortion between the 3D representation of the object and the re-constructed 3D representation of the object is minimized; and
encode modified attribute value information to be used at a decoder to generate a decoder generated re-constructed version of the object, wherein the attribute value information is based on the selected modified attribute values that minimize attribute value distortion.

12. The device of claim 11, wherein the 3D representation of the object is a three-dimensional (3D) mesh.

13. The device of claim 11, wherein the 3D representation of the object is a three-dimensional (3D) point cloud and the elements are points.

14. The device of claim 11 wherein to encode the spatial information, the program instructions, when executed on or across the one or more processors, cause the one or more processors to:

generate a K-D tree to be used by a decoder to re-construct a spatial organization of the elements of the object; or
generate an Octree to be used by a decoder to re-construct a spatial organization of the elements of the object; or
generate location correction information to be used by a decoder to re-construct a spatial organization of the elements of the object using a sub-sampled number of the elements of the object, a known or signaled prediction technique, and the location correction information.

15. The device of claim 11, wherein to encode the attribute information, the program instructions, when executed on or across the one or more processors, cause the one or more processors to:
assign an attribute value to at least one element of the object based, at least in part, on attribute information captured or generated for the element of the object; and
for respective other ones of the elements of the object:
identify a set of neighboring elements;
determine a predicted attribute value for the respective element based, at least in part, on predicted or assigned attributes values for the neighboring elements; and
determine an attribute correction value for the respective element, based, at least in part, on comparing the predicted attribute value for the respective element to a captured or generated attribute value for the respective element; and
encode the assigned attribute value for the at least one element; and data indicating, for the respective other ones of the elements, the determined attribute correction values.

16. A method comprising:
encoding spatial information for a three-dimensional (3D) representation of an object;
generating a re-constructed 3D representation of the object based on the encoded spatial information, wherein at least some spatial locations of elements or presence of elements of the object differs between the 3D representation of the object prior to the spatial information being encoded and the re-constructed 3D representation of the object;
determining respective differences between locations of the elements of the 3D representation of the object prior to the spatial information being encoded and spatial locations for corresponding elements in the re-constructed 3D representation of the object;
selecting modified attribute values to be encoded for the attribute values such that a level of attribute value distortion between the 3D representation of the object and the re-constructed 3D representation of the object is minimized; and
encoding modified attribute value information to be used at a decoder to generate a decoder generated re-constructed version of the object, wherein the attribute value information is based on the selected modified attribute values that minimize attribute value distortion.

17. The method of claim 16, wherein the 3D representation of the object is a three-dimensional (3D) mesh.

18. The method of claim 16, wherein the 3D representation of the object is a three-dimensional (3D) point cloud.

19. The method of claim 16 wherein said encoding the spatial information and said encoding the attribute information for the object comprises:

generating a K-D tree to be used by a decoder to re-construct a spatial organization of the elements of the object; or generating an Octree to be used by a decoder to re-construct a spatial organization of the elements of the object; or generating location correction information to be used by a decoder to re-construct a spatial organization of the elements of the object using a sub-sampled number of the elements the object, a known or signaled prediction technique, and the location correction information.

20. The method of claim 16, wherein said determining respective differences between locations of the elements of the 3D representation of the object prior to the spatial information being encoded and spatial locations for corresponding elements in the re-constructed 3D representation of the object comprises:

determining a first distortion amount between the 3D representation of the object prior to the 3D representation of the object being encoded and the re-constructed 3D representation of the object, wherein the first distortion amount is based on comparing the re-constructed 3D representation of the object to a pre-encoding version of the 3D representation of the object, and determining a second distortion amount between the re-constructed 3D representation of the object and the 3D representation of the object prior to the 3D representation of the object being encoded, wherein the second distortion amount is based on comparing the pre-encoding version of the 3D representation of the object to the re-constructed 3D representation of the object.

\* \* \* \* \*